United States Patent [19]

Newton

[11] 4,229,977

[45] Oct. 28, 1980

[54] TIRE BALANCING MACHINE SYSTEM

[75] Inventor: Robert P. Newton, Tampa, Fla.

[73] Assignee: Autodynamics, Inc., Tampa, Fla.

[21] Appl. No.: 2,744

[22] Filed: Jan. 11, 1979

Related U.S. Application Data

[62] Division of Ser. No. 709,544, Jul. 28, 1976, Pat. No. 4,139,041.

[51] Int. Cl.³ ............................................. G01M 1/06
[52] U.S. Cl. ....................................................... 73/487
[58] Field of Search ................. 73/459, 460, 480, 484, 73/487; 144/288 A

[56] References Cited

U.S. PATENT DOCUMENTS

| | | | |
|---|---|---|---|
| 3,267,977 | 8/1966 | Turpin | 144/288 A |
| 3,310,081 | 3/1967 | Cahill, Sr. | 144/288 A |
| 3,348,593 | 10/1967 | Turpin | 144/288 A |
| 4,168,627 | 9/1979 | Held et al. | 73/487 |

FOREIGN PATENT DOCUMENTS

| | | | |
|---|---|---|---|
| 2424668 | 12/1975 | Fed. Rep. of Germany | 73/480 |
| 2807343 | 8/1978 | Fed. Rep. of Germany | 73/487 |

*Primary Examiner*—Charles A. Ruehl
*Attorney, Agent, or Firm*—B. J. Powell

[57] ABSTRACT

A system for reducing undue vibrations transmitted to a vehicle by a tire assembly including a tire buffing or grinding machine, a tire balancing machine, and a mounting adapter for alternatively mounting the tire assembly on the tire buffing machine and the tire balancing machine. The tire buffing machine includes a drive unit for rotating the tire assembly about its rotational axis, a loading unit for radially loading the tire assembly, a buffing unit for selectively grinding away portions of the tire tread, and a control unit interconnecting the loading unit and the buffing unit to cause the buffing unit to reduce the loaded radial runout of the tire assembly.

6 Claims, 21 Drawing Figures

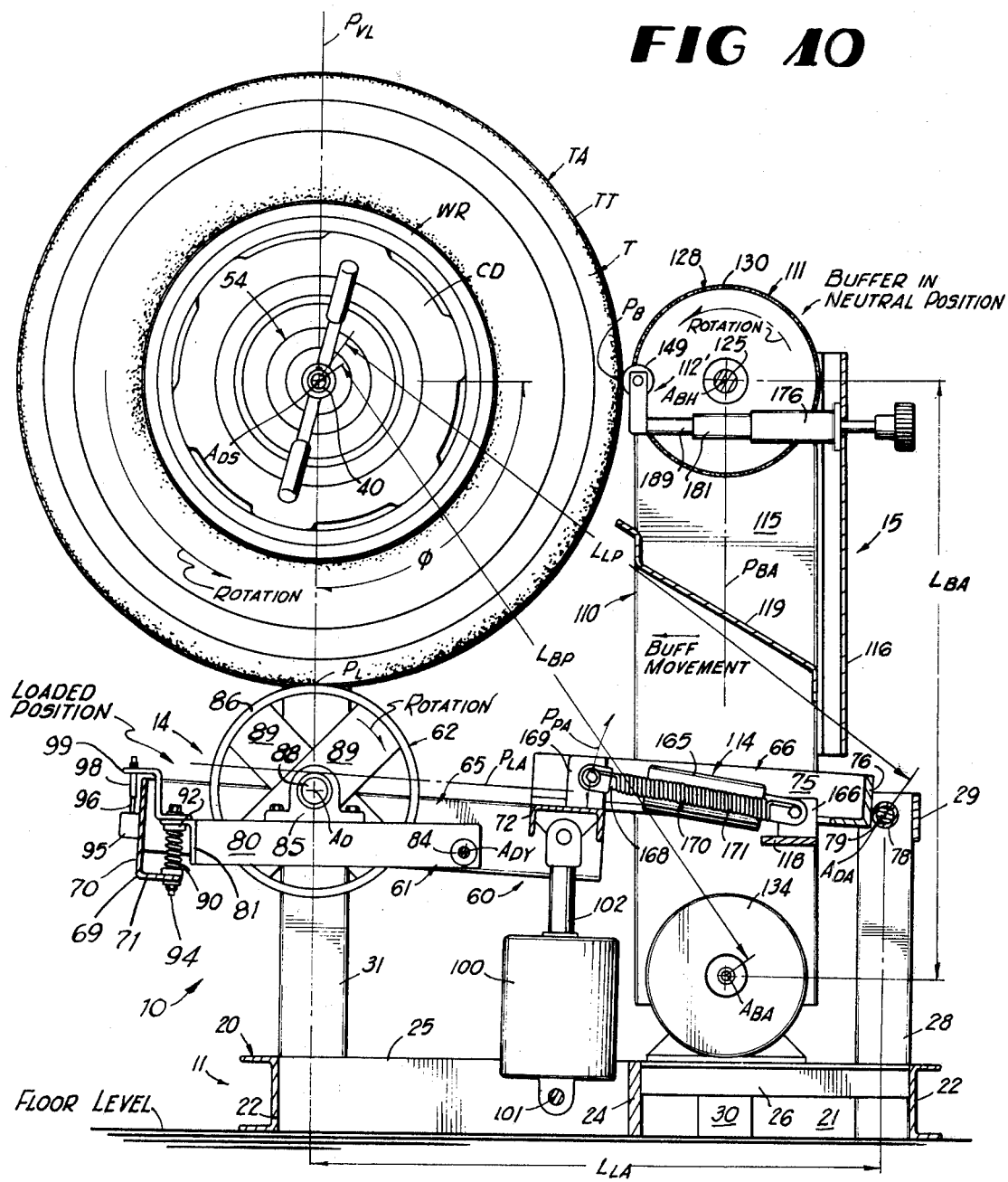

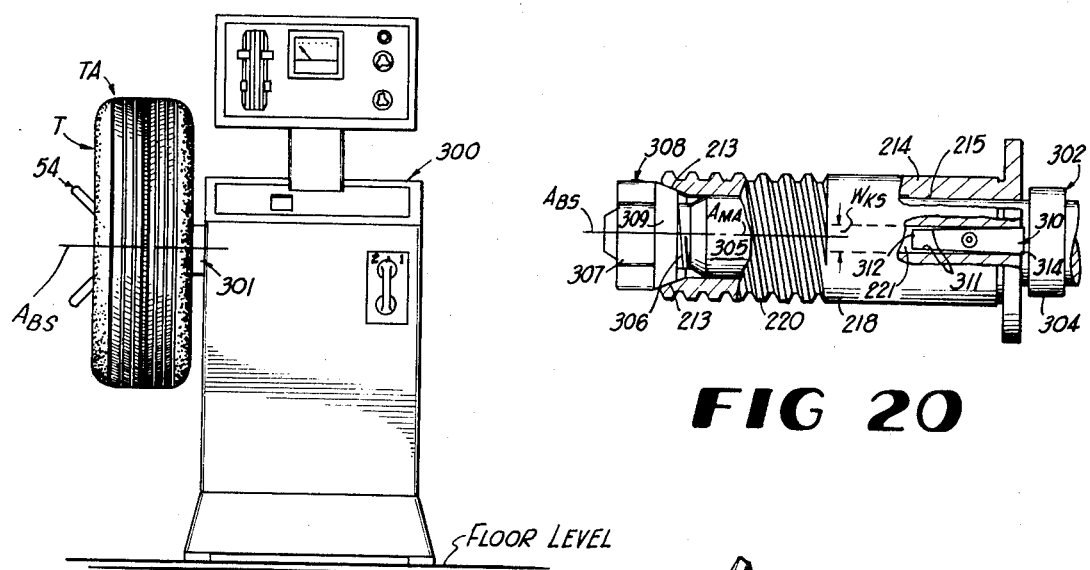
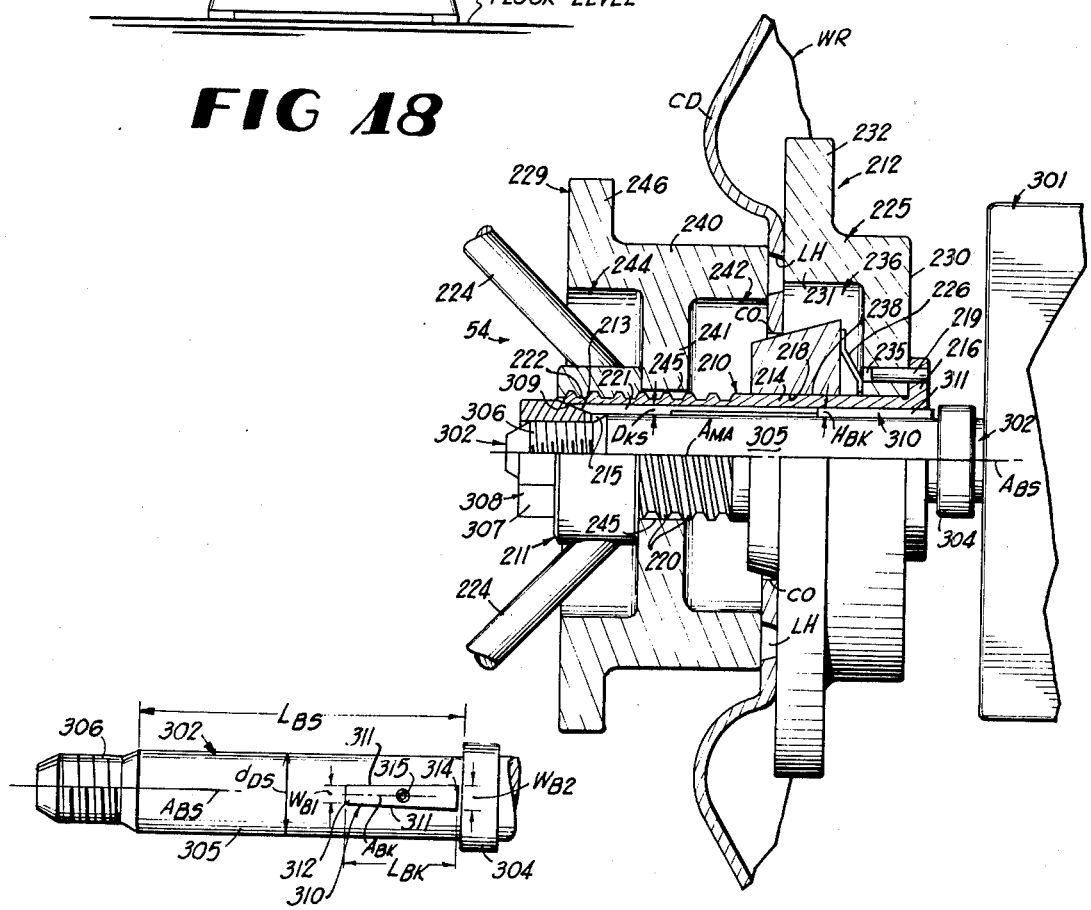
FIG 18
FIG 20
FIG 21
FIG 19

TIRE BALANCING MACHINE SYSTEM

CROSS REFERENCE TO RELATED APPLICATION

This application is a division of my co-pending application Ser. No. 709,544, filed July 28, 1976, now U.S. Pat. No. 4,139,041.

BACKGROUND OF THE INVENTION

Because vehicular tires support the sprung mass of a vehicle on a road surface and such tires are resilient, any irregularities in the dimensions of the tire or in its resiliency, any dimensional irregularities in the wheel rim, and/or any dynamic imbalance of the wheel rim and tire assembly will cause undue vibrations to be transmitted to the sprung mass of the vehicle thereby producing undesirable ride characteristics commonly known as "smooth road shake". One technique almost always used to reduce smooth road shake is to balance the wheel rim and tire assembly. For a number of years, the industry attempted to further reduce smooth road shake by measuring the unloaded radial and lateral runout of tires mounted on a wheel rim and removed portions of the tire tread to reduce the unloaded radial and lateral runout with a tire truing machine. Such machines are emplified in U.S. Pat. Nos. 3,752,207; 2,966,011; and 2,918,116. Because smooth road shake is generated when the tire is loaded by vehicular weight, the tire truing machines have not been successful in eliminating smooth road shake even when balancing was used. More recently, the automotive industry has begun using a technique known as "force variation tire grinding" in addition to balancing in an attempt to reduce the undue vibrations transmitted in the sprung mass of the vehicle. A number of devices using this technique have been proposed such as those shown by U.S. pat. Nos. 3,553,903; 3,681,877; and 3,725,137. While such devices have been relatively successful in reducing the undue vibrations transmitted to the sprung mass of the vehicle by the tires, their complexity, manufacturing cost, and the requirement of trained operating personnel has limited the use of these device primarily to the manufacturing facilities of the vehicle tire manufacturing companies. This has resulted in improved ride characteristics with respect to the original equipment tires on the vehicle but has done little to maintain the original improved ride characteristics when these original equipment tires are replaced by the second market. Further, these prior art devices have usually mounted the tire on an axle or arbor for testing rather than on the vehicular wheel rim. Because the wheel rim itself can have dimensional inaccuracies which affect the undue vibrations transmitted to the sprung mass of the vehicle, correcting the tires with force variation tire grinding without the tire being mounted on the wheel rim on which it is to be used with the vehicle frequently failed to compensate for the total irregularities of the wheel rim and tire combination even in combination with balancing.

In an attempt to compensate for the undue vibrations transmitted to the sprung mass of the vehicle by the wheel rim and tire combination in addition to balancing, a machine has been suggested that reduces the loaded radial runout of the wheel rim and tire combination while the wheel rim and tire combination is mounted on the vehicle. Such a device is disclosed in R. J. Caulfield and R. J. Higgins: "On-Car Tire Grinder for Improved Ride Smoothness" presented at the National Automobile Engineering Meeting, Detroit, Mich. (May, 1972) SAE Paper No. 720465. A similar device is shown in U.S. Pat. No. 3,905,160. Because these on-the-car grinders use the weight of the vehicle to load the wheel rim and tire combination, a great deal of effort must be expended to insure that the vehicle is substantially level and to insure that the sprung mass of the vehicle is properly supported by the wheel rim and tire combination in order to obtain proper loading during testing and grinding. Because the loading drum is also used to rotate the wheel rim and tire combination and the spacial relationship of the grinding rasps which grind the tire is controlled from the support frame carrying the drum, any slippage between the loading drum and tire results in the wheel rim and tire combination being improperly corrected. Further, because the rotational axis of the loading drum and the pivot axis of the grinding rasps support arm are held stationary in the grinder frame while the rotational axis of the wheel rim and tire combination can move with respect to both the drum rotational axis and the grinding arm pivot axis, the angular spacing between the loading point on the tire and the grinding point on the tire varies as the wheel rim and tire combination moves with respect to the loading drum rotational axis. This also causes improperly corrected tires.

SUMMARY OF THE INVENTION

These and other problems associated with the prior art are overcome by the invention disclosed herein by providing a tire correction system using an off-the-car tire buffer which is capable of correcting the loaded radial runout of an inflated tire mounted on a wheel rim and an off-the-car dynamic balancer to also balance the wheel rim and tire assembly to eliminate smooth road shake. The buffer is simple in manufacture, easy to operate, and accurate in operation. The buffer is arranged to compensate for deflection of the components of the machine due to the radial loading of the tire thereby allowing lightweight frame components to be used. The buffing head is accurately positioned adjacent the tire tread using a first force urging the buffing head toward engagement with the tire tread and a second force generated through a tread engaging assembly to oppose the first force to cause the buffing head to float in a neutral position adjacent the tire tread until a third force greater than the second force urges the buffing head into contact with the tire tread. The support arm assemblies movably mounting the tire loading drum and the buffing head are sized and located to allow different size tires to be accurately ground without machine adjustment. A mounting adapter is provided which accurately mounts the wheel rim and tire assembly so that the effective rotational axis of the assembly is aligned with the adapter central axis. The mounting adapter is removably and interchangably mountable on either the buffer or balancer and is keyed to each for positive driving of the wheel rim and tire assembly.

The apparatus of the invention includes a tire buffer, a tire balancer and a mounting adapter for supporting an inflated pneumatic tire while mounted on a vehicular wheel rim on either the tire buffer or tire balancer. The tire buffer includes generally a base frame which carries a tire driving assembly with a buffer drive spindle to mount and positively rotate an inflated pneumatic tire mounted on a vehicular wheel rim and supported on the mounting adapter; a loading drum assembly carried by the base frame and pivotable into engagement with the tire tread to radially load the tire; and a buffer assembly carried by the base frame and pivotable into engagement with the tire tread to selectively buff or grind away portions of the tire tread. The loading drum assembly includes a loading arm assembly pivoted to the base frame for movement toward and away from the tire tread by a loading cylinder, a drum yoke assembly pivoted on the loading arm assembly, and a loading drum rotatably mounted on the drum yoke assembly that engages the tire tread to radially load the tire. The pivotal position of the yoke assembly relative to the loading arm assembly is resiliently controlled so that the yoke is moved in response to variations in the loaded radial runout of the tire assembly. The buffer assembly includes a buffer arm assembly pivoted to the base frame for movement toward and away from the tire tread, a buffer head assembly mounted on the buffer arm assembly that engages the tire tread at a point angularly translated from the loading drum to selectively buff or grind away portions of the tire tread, a buffer arm positioning assembly that moves the buffer arm assembly relative to the tire tread and loading arm assembly and which is interconnected to the loading arm assembly to move the buffer arm assembly inwardly toward the tire tread as the loading arm assembly is moved inwardly toward the tire tread, and a spacer assembly for selectively urging the buffer head away from the tire tread in opposition to the buffer arm positioning assembly to locate the buffer head in a neutral position closely adjacent the tire tread. The buffer arm positioning assembly resiliently urges the buffer arm assembly toward the tire tread with a first positioning force offset by the spacer assembly and also forces the buffer arm assembly toward the tire tread with a second buffing force greater than the opposing force of the spacer assembly to cause the buffer head assembly to engage the tire tread. The driving spindle of the tire driving assembly is positively rotated and is removably keyed to the tire mounting adapter, to positively drive both the mounting adapter and wheel rim and tire assembly mounted on the mounting adapter. The drive spindle is cantilevered and angled toward the loading drum so that the deflection of the drive spindle under the loading of the tire assembly aligns the axis of the drive spindle with the axis of the loading drum.

The tire balancer of the invention includes generally a balancer drive spindle thereon to mount and positively spin the wheel rim and tire assembly supported on the mounting adapter. The balancer drive spindle is also removably keyed to the mounting adapter so that the mounting adapter can be shifted from the buffer to the balancer without removing the wheel rim and tire assembly therefrom.

The mounting adapter is removably and alternatively mountable on the buffer drive spindle and the balancer drive spindle so that the adapter central axis is coaxial with the rotational axis of the spindle mounting the adapter. Further, a keyed connection is provided between the adapter and each drive spindle so that the adapter will be positively driven by the drive spindle on which it is mounted. The adapter selectively mounts the wheel rim and tire assembly thereon so that the normal effective rotational axis of the wheel rim and tire assembly coincides with the mounting adapter central axis and is keyed to the adapter for positive rotation therewith.

These and other features and advantages of the invention will become more apparent upon consideration of the following specification and accompanying drawings wherein like characters of reference designate corresponding parts throughout the several views and in which:

BRIEF DESCRIPTION OF THE DRAWINGS

FIG. 10 is an enlarged view similar to FIG. 4 showing a mounted tire assembly in operative position on the machine;

FIG. 18 is a front view of a balancer machine of the invention;

FIG. 19 is an enlarged view shown partly in cross-section of the adapter of FIG. 13 mounted on the balancer drive spindle;

FIG. 20 is a view of the support sleeve of the adapter mounted on the balancer drive spindle with portions thereof broken away to show the mounting: and, FIG. 21 is an enlarged view of the balancer drive spindle.

These figures and the following detailed description disclose specific embodiments of the invention, however, the inventive concept is not limited thereto since it may be embodied in other forms.

DETAILED DESCRIPTION OF ILLUSTRATIVE EMBODIMENTS

The invention is designed to test and correct smooth road shake problems associated with a tire assembly, that is, an inflated pneumatic vehicular tire mounted on a vehicular wheel rim. The pneumatic tire T (FIG. 1) has a peripheral road engaging tread TT thereon while the wheel rim WR has a central disk CD that defines lug holes LH (FIG. 13) therein and a central axle opening CO (FIG. 13) therethrough so that the wheel lugs on a vehicle can mount the tire assembly TA on the vehicle.

The tire correction system of the invention includes a buffing machine 10 seen in FIGS. 1-11; a balancing machine 300 seen in FIG. 18; and a mounting adapter 54 seen in FIGS. 12-16, 19 and 20. The mounting adapter 54 mounts the tire assembly TA thereon so that the effective rotational axis of the tire assembly TA coincides with the adapter central axis. The adapter 54 can then be used to alternatively mount the tire assembly TA first on the buffing machine 10 to test and correct the tire assembly for excessive loaded radial runout and secondly on the balancing machine 300 to balance the tire assembly.

Figure 1:
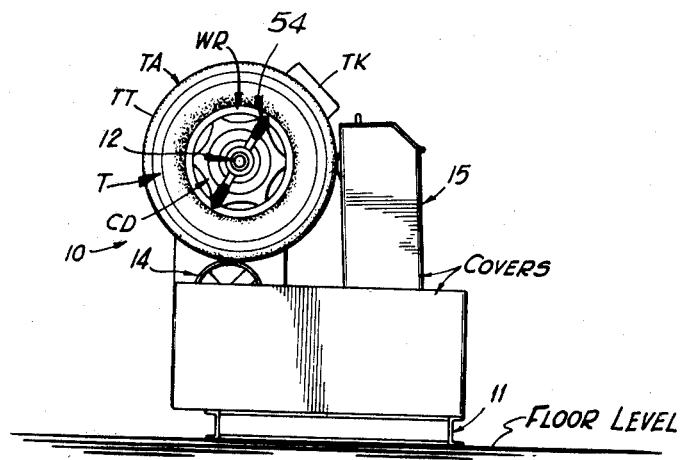
FIG. 1 is a front elevational view of a machine embodying the invention with a wheel rim and tire mounted thereon.

As seen in FIG. 1, the buffing machine 10 of the invention includes generally a base frame 11 which mounts a tire driving unit 12 thereon to support and rotate the adapter 54 with the tire assembly TA; a tire loading unit 14 which radially loads the tire T; and a buffer unit 15 which selectively buffs or grinds away portions of the tire tread TT in response variations in loaded radial runout of the tire T against the loading unit 14. Provision is made for automatically testing the tire assembly TA to determine if the variations in the loaded radial runout exceed a prescribed limit and to buff the tire tread TT until the variations in the loaded radial runout fall below the prescribed limit. It will be noted that the tire assembly TA is removed from the vehicle while it is being tested and corrected thereby making the machine 10 an "off-the-car" machine.

For purposes of this application, loaded radial runout shall mean the variations in radial dimension of the tire tread TT from the tire assembly rotational axis while the tire assembly TA is under a prescribed load through its peripheral tread TT at a loading position at which the radial dimension is measured. Because all of the tread TT is rotated through the loaded position, the loaded radial runout is measured along the entire length of the peripheral tread TT.

BASE FRAME

Figure 2:
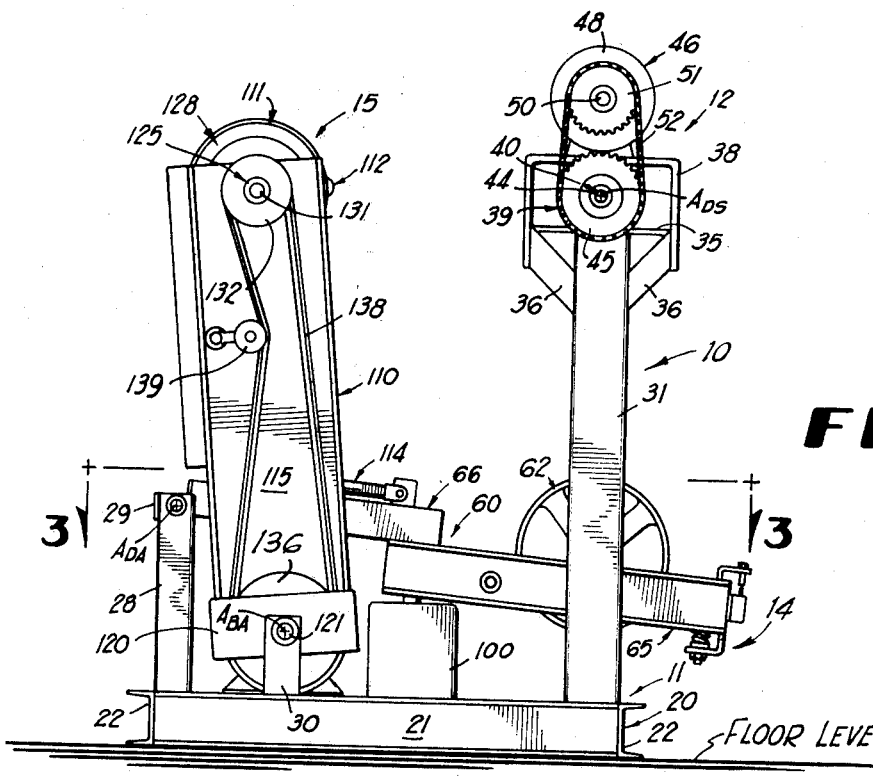
FIG. 2 is an enlarged rear elevational view of the machine of FIG. 1 with the covers removed.
Figure 3:
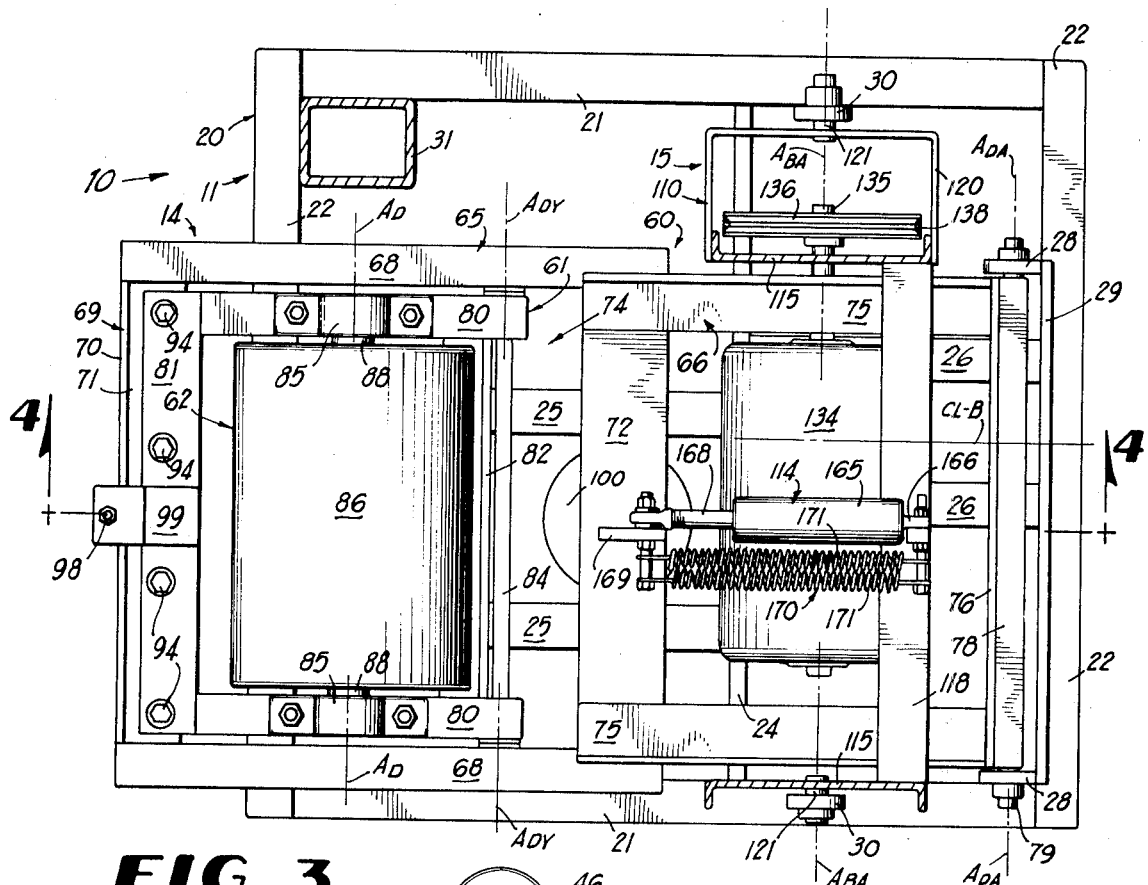
FIG. 3 is an enlarged cross-sectional view taken along line 3—3 in FIG. 2.
Figure 4:
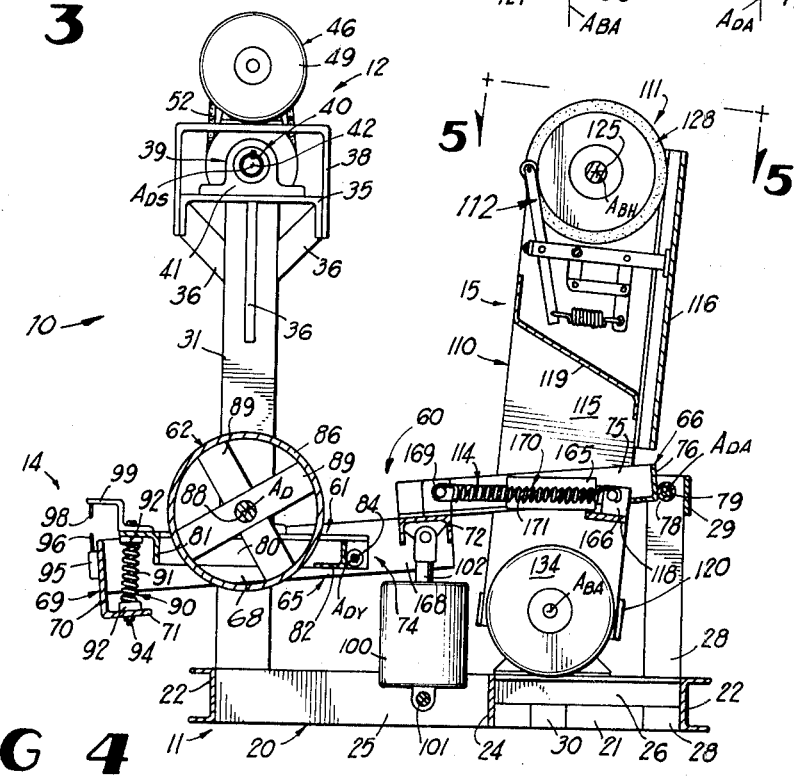
FIG. 4 is a reduced longitudinal cross-sectional view taken along line 4—4 in FIG. 3.
Figure 11:
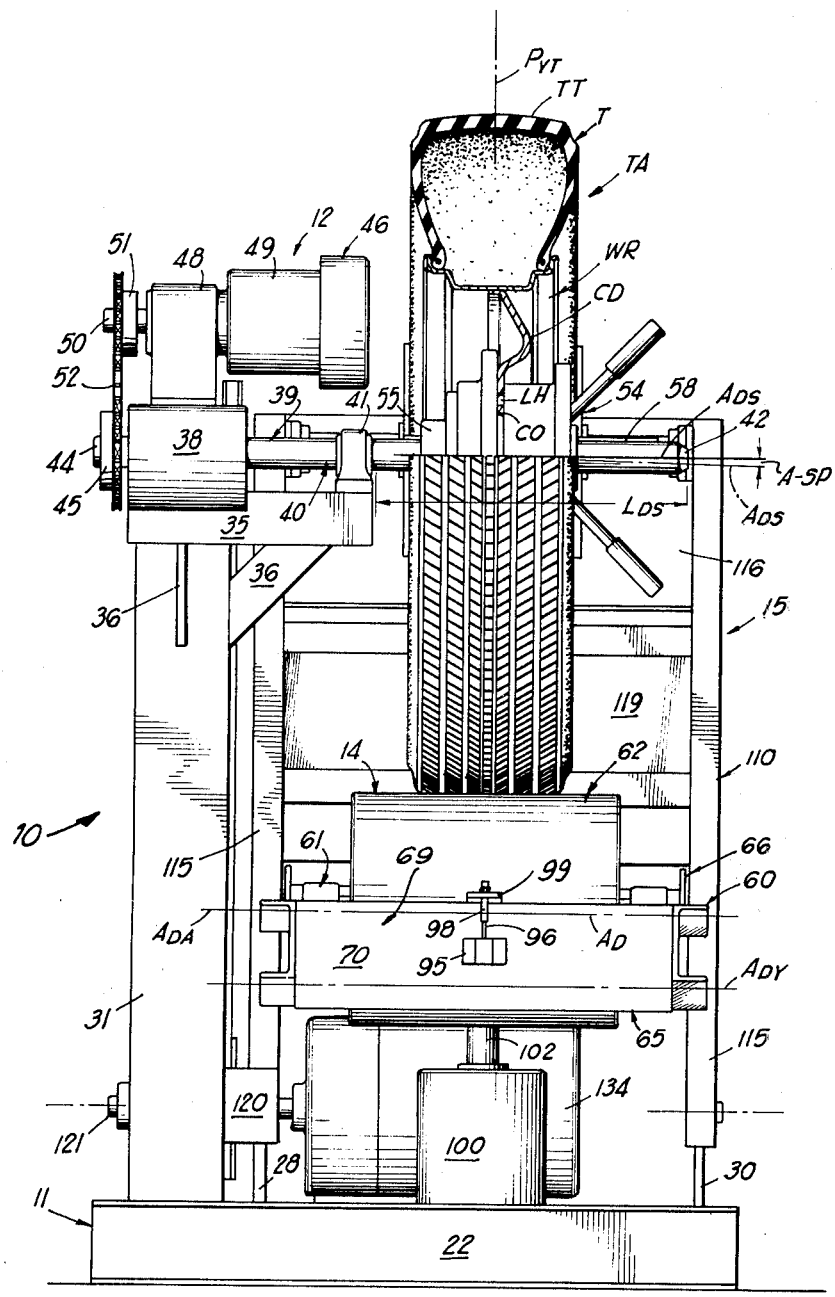
FIG. 11 is a left elevational view of FIG. 10.

Referring to FIGS. 2-4, the base frame 11 includes an open rectilinear base 20 which sits on the floor to support the machine. Base 20 has a base centerline CL-B (FIG. 3) and includes spaced apart, parallel side channels 21 joined at opposite ends by spaced apart, parallel end channels 22. The side channels 21 are joined intermediate their ends by an intermediate cross plate 24 (FIGS. 3 and 4) normal to centerline CL-B. A pair of opposed, parallel, spaced apart cylinder support channels 25 extend between the cross plate 24 and the left end channel 22 as seen in FIGS. 3 and 4 which are oriented parallel to the centerline CL-B and centered on the tread central plane $P_{VT}$ of the tire assembly TA as seen in FIG. 11. A pair of opposed, parallel, spaced apart motor support angles 26 extend between the cross plate 24 and the right end channel 22 as seen in FIGS. 3 and 4 which are also oriented parallel to the centerline CL-B. A pair of opposed, upstanding loading arm pivot plates 28 are mounted on the right end channel 22 as seen in FIGS. 3 and 4 with their upper ends joined by a tie plate 29. A pair of shorter opposed, upstanding buffer pivot plates 30 are mounted on side channels 21 between the cross plate 24 and right end channel 22 as seen in FIGS. 3 and 4. An upstanding support post 31 is mounted on the base 20 at the far corner between the rear side channel 21 and the left end channel 22 as seen in FIG. 3. The tire driving unit 12 is mounted on top of post 31; the tire loading unit 14 is pivoted between the upper ends of the loading arm pivot plates 28 about pivot axis $A_{DA}$ normal to base centerline CL-B; and the buffer unit 15 is pivoted between the upper ends of the buffer pivot plates 30 about pivot axis $A_{BA}$ also normal to base centerline CL-B.

TIRE DRIVING UNIT

Referring to FIGS. 2, 4 and 11, the tire driving unit 12 mounts the tire assembly TA so that the tire T can be loaded by the loading unit 14 and buffed by the buffing unit 15. The driving unit 12 includes a spindle platform 35 mounted on the top of post 31 so that its upper surface is generally parallel to and spaced above the axis $A_{DA}$ and $A_{BA}$. Appropriate braces 36 reinforce platform 35. An inverted U-shaped motor bracket 38 is mounted on opposite sides of platform 35 and extends thereabove.

A drive spindle assembly 39 (FIGS. 4 and 11) is carried on the upper surface of platform 35. The spindle assembly 39 includes an elongate drive spindle 40 which is rotatably journalled in bearing blocks 41 mounted on platform 35 so that the front projecting end 42 of spindle 40 extends forwardly in cantilever fashion over the loading unit 14. The rotational axis $A_{DS}$ of spindle 40 is generally parallel to the pivot axes $A_{DA}$ and $A_{BA}$. The rear projecting end 44 (FIG. 11) of spindle 40 extends rearwardly from the platform 35 to mount a driven sprocket 45 thereon.

A drive unit 46 (FIG. 11) is carried by the bracket 38 above the spindle assembly 39. The drive unit 46 includes a gear reducer 48 coupled to a drive motor 49 so that the output shaft 50 of the gear reducer 48 extends rearwardly of bracket 38 and mounts driven sprocket 51 thereon. A drive chain 52 connects sprockets 45 and 51 so that motor 49 positively rotates the drive spindle 40. While the motor 49 may rotate the spindle 40 at any selected speed, a spindle rotation speed of about 20 rpm has worked satisfactorily. It will further be noted that the spindle 40 has a projecting length $L_{DS}$ (FIG. 11) such that it extends across and over the loading unit 14 as will become more apparent.

The tire assembly TA is mounted on spindle 40 through mounting adapter 54 (FIG. 11) described more fully hereinafter. The adapter 54 mounts the tire assembly TA on the spindle 40 so that the spindle axis $A_{DS}$ coincides with the effective rotational axis of the tire assembly TA when mounted on a vehicle. Thus, as the tire assembly TA rotates with the spindle 40, the tire assembly TA is rotated about its effective rotational axis on the vehicle. The position of the tire assembly TA longitudinally of the spindle 40 is controlled by a stop 55 which can be selectively fixed to spindle 40 by a set screw 56 seen in FIG. 13. The stop 55 limits the forward movement of the tire assembly TA along the spindle 40 and is located behind the tire assembly TA. Because the spindle 40 is cantilever mounted from the platform 35, there is a tendency for the spindle 40 to be deflected away from the loading position of the tire T unless the frame 11 and spindle 40 are made extremely strong. This problem is solved by angling the projecting end 42 of spindle 40 toward the loading position $P_L$ on the tire T in the diametrically extending loading plane $P_{VL}$ passing through loading position $P_L$ in FIG. 10. The amount of the angle A-SP as seen in FIG. 11 when the tire T is unloaded is selected so that the axis $A_{DS}$ of spindle 40 will be shifted up to a position so that the axis $A_{DS}$ is substantially parallel to the axes $A_{DA}$ and $A_{BA}$ when the tire T is loaded. The loaded position is shown in FIG. 11 with the axis $A_{DS}$ shown in its unloaded position by a phantom line in FIG. 11. This also serves to constantly urge the tire assembly TA rearwardly along the spindle 40 when it is loaded so that it is not necessary to lock the front side of the tire assembly TA onto the spindle.

Figure 14:
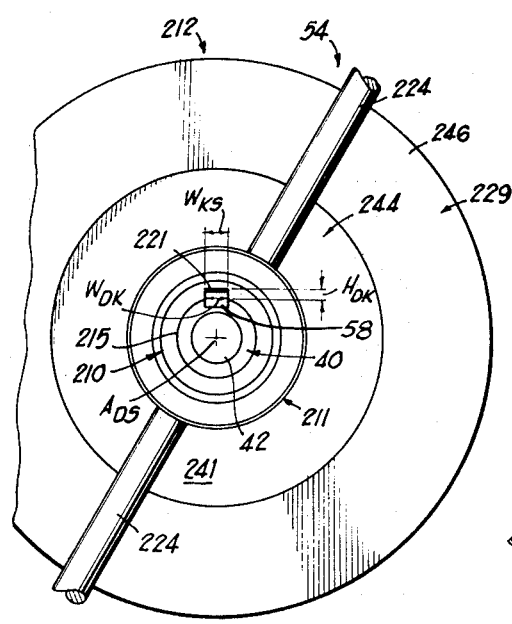
FIG. 14 is a front view of the adapter assembly of FIG. 13.

To insure that the tire assembly TA will be positively driven by the spindle 40, a drive key 58 (FIG. 11) is provided along spindle 40 to engage the adapter 54 as will be explained. Thus, a positive timing relationship is maintained between the loading position and the buffing position. The drive key 58 has a constant width $W_{DK}$ along its length and a constant exposed as seen in FIG. 14 along its length as will become more apparent.

TIRE LOADING UNIT

The tire loading unit 14 best seen in FIGS, 3, 4 and 10 serves to radially load the tire T through its peripheral tread TT to determine the radial runout of the loaded tire assembly TA. The loading unit 14 includes a loading arm assembly 60 which is pivoted at one end to the drum pivot plates 28 about the axis $A_{DA}$, a drum yoke assembly 61 pivoted to the loading arm assembly 60 about a yoke pivot axis $A_{DY}$ parallel to axis $A_{DA}$, and a loading drum 62 rotatably mounted on the yoke assembly 61 about rotation axis $A_D$ generally parallel to axes $A_{DA}$ and $A_{DY}$. Thus, it will be seen that the pivot axis $A_{DY}$ is pivoted about axis $A_{DA}$ as the arm assembly 60 is pivoted. The drum rotational axis $A_D$, on the other hand, is pivoted about the pivot axis $A_{DY}$ as the yoke assembly 61 is pivoted with respect to the loading arm assembly 60 and also may be pivoted about the arm axis $A_{DA}$ along with yoke assembly 61 as the arm assembly 60 is pivoted.

The loading arm assembly 60 is stepped with primary frame section 65 which mounts the yoke assembly 61 and a secondary frame section 66 which connects the primary frame section 65 to the pivot plates 28. The primary frame section 65 includes a pair of opposed, parallel side channels 68 which are parallel to the base centerline CL-B. The left ends of the side channels 68 seen in FIGS. 3 and 4 are joined by a transverse front L-shaped plate 69. The vertical leg 70 of front plate 69 is higher than side channels 68 so that the horizontal leg 71 thereof is located below and extends rearwardly under side channels 68 as will become more apparent. The right ends of the side channels 68 seen in FIGS. 3 and 4 are joined by a back channel 72 flush with the upper edges of the side channels 68. Thus, the primary frame section 65 defines a yoke receiving opening 74 bounded by side channels 68, front plate 69, and back channel 72.

The secondary frame section 66 includes a pair of side angles 75 connected to the back channel 72 of primary frame section 65 and projecting to the right in FIGS. 3 and 4. The right ends of side angles 75 in FIGS. 3 and 4 are joined by an end plate 76. A pivot tube 78 is connected to the right side of end plate 76. A pivot shaft 79 is rotatably received through tube 78 and is journalled between the upper ends of pivot plates 28. Thus, the arm assembly 60 is pivoted about the centerline of shaft 79 which is the axis $A_{DA}$.

The yoke assembly 61 is pivotally mounted between the side channels 68 in the primary frame section 65 of loading arm assembly 60. The yoke assembly 61 includes a pair of opposed, parallel side angles 80 generally parallel to base centerline CL-B (FIG. 3) joined at their left ends by front angle 81 and just inwardly of their right ends by back angle 82. The right ends of side angles 80 are pivoted on pivot shaft 84 which is journalled between the side channels 68 of primary frame section 65. The centerline of shaft 84 forms yoke axis $A_{DY}$. The size of yoke assembly 61 and location of yoke axis $A_{DY}$ are such that the yoke assembly 61 pivots in the yoke receiving opening 74 without interfering with the loading arm assembly 65.

A pair of drum bearing blocks 85 are mounted opposite each other on the side angles 80 of yoke assembly 61. The bearing blocks 85 rotatably journal the loading drum 62 therebetween about drum axis $A_D$.

The loading drum 62 includes a cylindrical side wall 86 mounted on a drum axle 88 by end pieces 89 so that side wall 86 is concentric about axle 88. Axle 88 is rotatably journalled between bearing blocks 85 so that the centerline of axle 88 if the rotation axis $A_D$.

The pivotal position of yoke assembly 61 and thus drum axis $A_D$ about axis $A_{DY}$ relative to the primary frame section of loading arm assembly 60 is controlled by a spring assembly 90 which resiliently connects the front angle 81 on yoke assembly 61 to the horizontal leg 71 on front plate 69 of loading arm assembly 60 as seen in FIGS. 4 and 10. The spring assembly 90 includes a plurality of compression coil springs 91 positioned between angle 81 on yoke assembly 61 and leg 71 on loading arm assembly 60. The springs 91 are held in position by keepers 92 and bolts 94. The bolts 94 limit the extension of springs 91 and may be easily removed to change the springs 91 for different loading values or for replacement. The number of springs 91 may be varied, however, four are shown (FIG. 3). Thus, when the loading arm assembly 60 is pivoted clockwise upwardly about axis $A_{DA}$ from its unloaded position seen in FIG. 4 toward its loaded position seen in FIG. 10, the tire tread TT engages the side wall 86 of loading drum 62 and forces the yoke assembly 61 counterclockwise about axis $A_{DY}$ from the unloaded position seen in FIG. 4 toward its loaded position seen in FIG. 10 against springs 91.

A motion or displacement transducer 95 is mounted centrally of front plate 69 as seen in FIGS. 10 and 11 so that its operating plunger 96 will be engaged by a drive pin 98 carried by an offset bracket 99 on yoke assembly 61. When drive pin 98 engages plunger 96 on transducer 95, the movement of yoke assembly 61 produces a corresponding change in output from transducer 95. This output is indicative of the loaded radial runout of the tire assembly T.

The loading arm assembly 60 is positioned by a loading cylinder 100 which is pinned to the base 20 by a pin 101 (FIG. 10) extending between the support channels 25 and oriented normal to the base centerline CL-B. The piston rod 102 from cylinder 100 is pinned to the center of the underside of the back channel 72. Thus, as piston rod 102 is extended, the loading arm assembly 60 is pivoted clockwise to cause the loading drum 62 to engage the tire tread TT as seen in FIG. 10. As piston rod 102 is retracted, the loading arm assembly 60 is pivoted counterclockwise to release the tire tread. When the tire assembly TA is properly loaded, the loading cylinder 100 is locked to maintain the load on the tire assembly.

BUFFER UNIT

The buffer unit 15 as best seen in FIGS. 2-6 serves to selectively buff or grind the peripheral tread TT of the tire T to reduce the loaded radial runout indicated by transducer 95 to an acceptable level. The buffer unit 15 includes a buffer arm assembly 110 (FIGS. 3 and 4) which is pivoted at one end between the buffer pivot plates 30 about the buffer pivot axis $A_{BA}$, a buffer head assembly 111 (FIGS. 4–6) mounted on the upper end of the buffer arm assembly 100, a buffer spacer assembly 112 (FIGS. 4–6) carried by the upper end of the buffer arm assembly 110 adjacent the buffer head assembly to position the buffer head assembly 111 with respect to the tire tread TT, and a buffer arm positioning assembly 114 (FIGS. 3 and 4) which positions the buffer arm assembly 110 to selectively locate the buffer head assembly 111 adjacent the tire tread.

Figure 6:
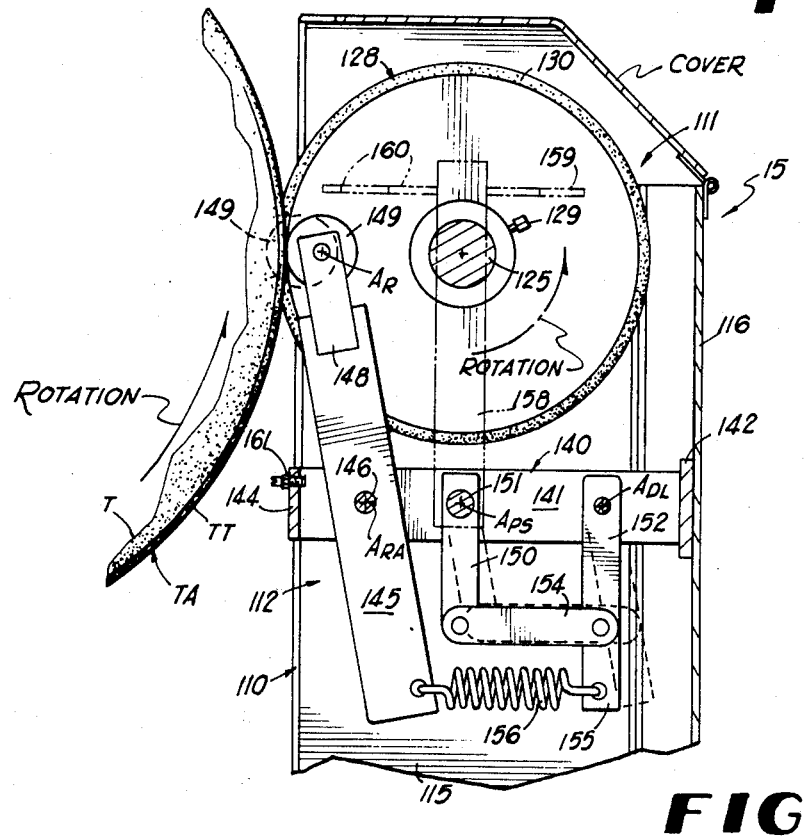
FIG. 6 is a cross-sectional view of the buffer assembly taken along line 6—6 in FIG. 5.

The buffer arm assembly 110 includes a pair of opposed upstanding side channels 115 with the side channels 115 being positioned just outboard of the side angles 75 of the secondary frame section 66 on the loading arm assembly 60. The side channels 115 are parallel to each other and generally normal to the pivot axis $A_{BA}$ of the buffer unit 15. The side channels 115 are connected along their right edges as seen in FIGS. 4 and 6 by an offset back plate 116 to maintain the side channels 115 at a spaced apart position. A tie bar 118 connects the side channels 115 just below the secondary frame section 66 of the loading arm assembly 60 as best seen in FIG. 4. The tie bar 118 is located sufficiently far below the secondary frame section 66 so that the tie bar 118 will clear the secondary frame section 66 as the buffer unit 15 and the loading unit 14 are pivoted with respect to each other. A Z-shaped deflector plate 119 extends between the side channels 115 above the secondary frame section 66 as seen in FIG. 4. The deflector plate 119 serves to reinforce the buffer arm assembly 110 while at the same time deflecting any grindings or dust generated by the buffer head assembly 111 outboard of the working components of the machine. The lower end of the front side channel 115 is connected directly to the front buffer pivot plate 30 while the rear side channel 115 is connected to the rear buffer pivot plate 30 through a U-shaped pivot bracket 120 as best seen in FIGS. 2 and 3. The buffer arm assembly 110 is pivoted to the pivot plates 30 by stub shafts 121 carried by the front side channel 115 and the pivot bracket 120.

Figure 5:
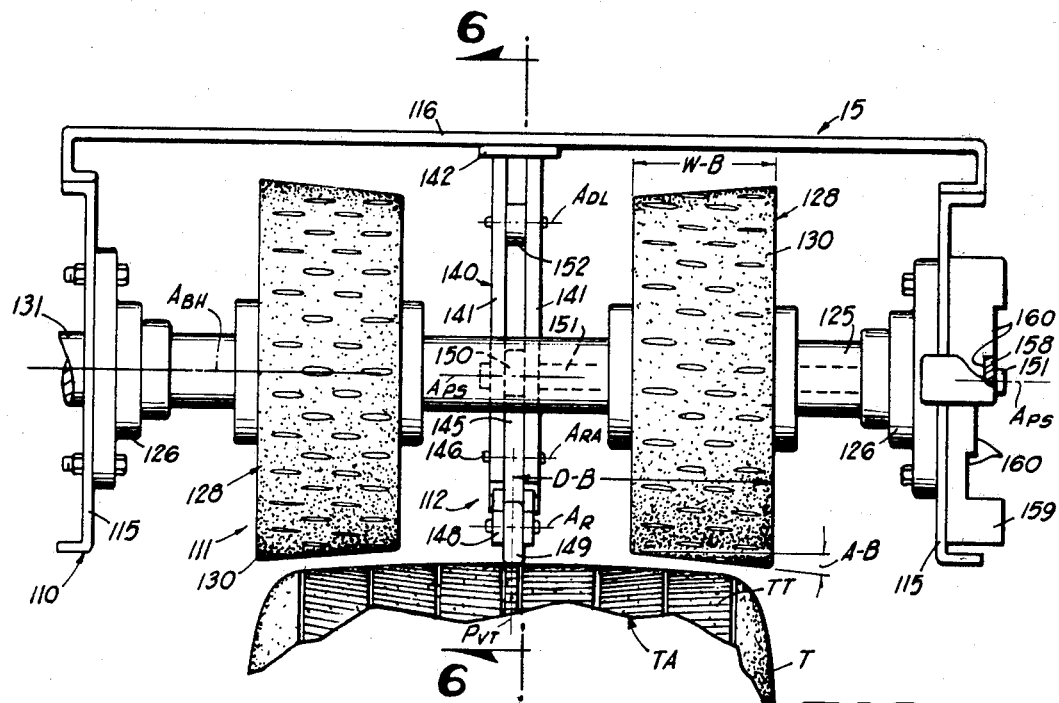
FIG. 5 is an enlarged top view of the buffer assembly taken along line 5—5 in FIG. 4.

The buffer head assembly 111 includes a driven shaft 125 which is journalled between bearing blocks 126 mounted at the upper end of the side channels 115 as seen in FIG. 5, so that the rotational axis $A_{BH}$ of the driven shaft 125 is parallel to the buffer arm pivot axis $A_{BA}$ and spaced thereabove. A pair of buffing rasps 128 are mounted on the driven shaft 125 as best seen in FIGS. 5 and 6 and are locked onto the shaft 125 by lock screws 129 seen in FIG. 6 so that the buffing rasps 128 can be slidably positioned longitudinally of the shaft 125 and locked onto the shaft 125 by the lock screws 129. Each of the buffing rasps 128 defines a tapered exterior roughened buffing surface 130 thereon which tapers inwardly toward the center of the tire at an angle A-B best seen in FIG. 5. While different angles A-B may be used, an angle of about 5° has been found appropriate. It will also be noted that the buffing surface 130 of each rasp 128 has a width W-B which is usually about three inches and that the outboard edges of the buffing rasps 128 are located outboard of the tire central plane $P_{VT}$ of the tire assembly TA as seen in FIG. 5 a distance D-B. Thus, it will be seen that the rasps 128 are centered on the tire central plane $P_{VT}$ and the distance D-B is selected so that the outboard edges of the rasps 128 are located just outboard of the outboard shoulders of the tire tread TT. The rearwardly projecting end 131 of the driven shaft 125 projects through the side channel 115 rearwardly thereof and mounts the driven pulley 132 thereon as best seen in FIG. 2. A buffer drive motor 134 (FIGS. 3 and 4) is mounted between the side channels 115 on the buffer arm assembly 110 below the tie bar 118. The buffer drive motor 134 is mounted on the motor support angles 26 on the base frame 11 as best seen in FIGS. 3 and 4 so that its drive shaft 135 is centered on the buffer arm pivot axis $A_{BA}$. The drive shaft 135 projects rearwardly through the back side channel 115 as best seen in FIG. 3 and mounts a drive pulley 136 thereon as best seen in FIGS. 2 and 3. A drive belt 138 connects the drive pulley 136 with the driven pulley 132 as best seen in FIG. 2 and tension is maintained thereon by the tension assembly 139. Thus, it will be seen that the drive motor 134 rotates the buffing rasps 128 counterclockwise as seen in FIG. 6 at a high rate of speed, and, when the buffing surfaces 130 on the buffing rasps 128 come into contact with the tire tread TT, they remove portions of the tire tread adjacent the shoulders.

The spacer assembly 112 as best seen in FIGS. 5 and 6 serves to selectively maintain the buffing surfaces 130 of the buffing rasps 128 closely adjacent the tire tread TT as seen in FIG. 5 until it is desirable to force the buffing surfaces 130 into contact with the tire tread to selectively grind away portions thereof. The spacer assembly 112 includes a spacer support arm 140 which is mounted on the back plate 116 just below the driven shaft 125 of the buffer head assembly 111, in alignment with the central tire tread plane $P_{VT}$ and generally normal to the back plate 116. The spacer support arm 140 includes a pair of spaced apart generally parallel side plates 141 that are parallel to the tread plane $P_{VT}$ and which are mounted on the back plate of the buffer arm assembly 110 by a base plate 142. The inboard ends of the side plates 141 are connected by end plate 144. Roller arm 145 is pivotally mounted between the side plates 141 adjacent the inboard end thereof on a pivot shaft 146. The upper end of the roller arm 145 is provided with support tabs 148 which rotatably mount a tread engaging spacer roller 149 therebetween about roller axis $A_R$. It will be noted that the roller axis $A_R$ and the roller arm pivot axis $A_{RA}$ are both parallel to the rotational axis $A_{BH}$ of the buffer head assembly 111. The lower end of the roller arm 145 projects below the spacer support arm 140 as will become more apparent. A positioning link 150 is pivoted between the side plates 141 just outboard of the roller arm 145 on a drive shaft 151 about axis $A_{PS}$ parallel to the buffer head rotational axis $A_{BH}$. A drive link 152 is also pinned between the side plates 141 outboard of the positioning link 150 about a drive link pivot axis $A_{DL}$ which is parallel to the arm axis $A_{RA}$ and the drive shaft axis $A_{PS}$. The positioning link 150 and the drive link 152 are maintained parallel to each other as they pivot by transfer link 154 pinned between positioning link 150 and the drive link 152 equal distances along the positioning link 150 and the drive link 152 from their pivot axes $A_{DL}$ and $A_{PL}$. It will be noted that the drive link 152 extends past the transfer link 154 and the projecting end 155 of the link 154 is connected to one end of an expansion coil spring 156 whose other end is connected to the lower end of the roller arm 145. It will thus be seen that the coil spring 156 serves to urge the spacer roller 149 away from the driven shaft 125 and inboard toward the tire assembly TA until the spring 156 is completely relaxed. The drive shaft 151 connected to the positioning link 150 extends laterally out through the front side channel 115 and is connected to a positioning handle 158 which extends up over the top of the side channel 115. The positioning handle 158 is shown by solid lines in FIG. 5 and phantom lines in FIG. 6. A notched guide plate 159 is mounted on the upper end of the front side channel 115 and is provided with adjustment notches 160 which engage the positioning handle 158 as best seen in FIG. 5. It will be noted that the positioning handle 158 is sufficiently flexible to be positioned in any of the adjustment notches 160 and that the coil spring 156 is urging the top of the positioning handle 158 outboard of the machine or clockwise as seen in FIG. 6 so that the positioning handle 158 will be maintained in the appropriate adjustment notch 160, especially when the spacer roller 149 is engaging the tire tread TT as seen in FIGS. 5 and 6. The movement of the spacer roller 149 inboard away from the driven shaft 125 carrying the buffing rasps 128 is limited by an adjustable stop screw 161 in the end plate 144 in FIG. 6. The amount of force exerted on the tire tread TT by the spacer roller 49 is thus adjusted by movement of the positioning handle 158 into a selected one of the adjustment notches 160. This allows the machine to be adjusted to handle tire treads TT that have a different cross sectional curvature thereacross as will become more apparent.

The buffer arm positioning assembly 114 is best seen in FIGS. 3, 4 and 10 and includes double acting fluid cylinder 165 which is pinned to attachment tab 166 centrally located on top of the tie bar 118. The projecting end of the piston rod 168 of the fluid cylinder 165 is pinned to an attachment tab 169 centrally located on top of the back channel 72 on the loading arm assembly 60. It will thus be seen that, as the piston rod 168 is retracted into the fluid cylinder 165, the buffer arm assembly 110 will be pivoted counterclockwise as seen in FIGS. 4 and 10 inwardly toward the tire tread to cause the buffing rasps 128 to engage the tire tread TT as seen in FIG. 6. As the piston rod 168 is extended from the fluid cylinder 165, the buffer arm assembly 110 will be rotated clockwise to move the buffer head assembly 111 outwardly away from the tire tread TT as best seen in FIG. 4. An expansion coil spring assembly 170 is also connected between the attachment tabs 166 and 169 to selectively urge the buffer arm assembly 110 counterclockwise as seen in FIGS. 4 and 10 to move the buffer spacer assembly 112 into contact with the tire tread TT. The expansion coil spring assembly 170 includes one or more expansion coil springs 171. While different numbers of coil springs 171 may be used, two coil springs 171 are illustrated. The coil springs 171 exert a force on the buffer arm assembly 110 where the magnitude of the force decreases as the buffer head assembly 111 moves toward the tire tread TT. On the other hand, once the spacer roller 149 engages the tire tread TT so that the tire tread TT forces the spacer roller 149 clockwise about the roller arm axis $A_{RA}$ as the buffer arm assembly 110 continues to pivot toward the tire tread TT, the force exerted on the buffer arm assembly 110 by the spacer assembly spring 156 increases in magnitude. The coil springs 171 of the coil spring assembly 170 on the positioning assembly 114 and the spring 156 on the spacer assembly 112 are sized so that the decreasing positioning force exerted on the buffer arm assembly 110 by the springs 171 reaches a magnitude equal to the magnitude of the increasing spacing force exerted on the buffer arm assembly 110 by the spring 156. At this neutral point, the net force on the buffer arm assembly 110 is zero and the opposed forces by the springs 156 and 171 neutralize each other to stop the movement of the buffer head assembly 111 toward the tire tread TT. The positioning handle 158 is adjusted so that this neutral position which is shown in FIG. 5 is reached when the buffing surfaces 130 of the buffing rasps 128 and buffing head assembly 111 are closely adjacent to the tire tread TT but not actually touching it. Usually, this spacing is about one-fourth of an inch. Because the cross-sectional curvature of the tire tread TT may change from tire to tire, the actual neutral position of the roller arm 145 may have to be changed by manipulating the positioning handle 158 to maintain the neutral spacing between the buffing surfaces 130 and tire tread TT.

When it is desirable to cause the buffing surfaces 130 on the buffing rasps 128 to engage the tire tread to remove a portion of the shoulders thereof, the full operating pressure of the working fluid from an appropriate source (not shown) is applied to the fluid cylinder 165 to retract the piston rod 168. While the working pressure may vary, usually the working fluid pressure is around 100–120 psi. This generates a grinding force on the buffer arm assembly 110 greater than the reactive spacing force applied by the spacer assembly 112 so that this greater grinder force urges the buffer arm assembly 110 counterclockwise as seen in FIG. 4 against the action of the spring 156 in the spacer assembly 112 to cause the buffing surfaces 130 to engage the tire tread TT along its opposite shoulders as shown in FIG. 6. It will be noted that the amount the buffer arm assembly 110 can rotate counterclockwise under the force of the fluid cylinder 165 is limited only by engagement of the buffing rasps 128 with the tire tread TT and that the grinding rasps 128 are urged into contact with the tire tread TT at a substantially constant force. When it is desirable to move the buffing rasps 128 out of engagement with the tire tread TT, the working fluid pressure on the fluid cylinder 156 is released and the spring 156 in the spacer assembly 112 urges the buffer arm assembly 110 clockwise back to the neutral position seen in FIG. 5 where the force of the spring 156 neutralizes the force of the coil springs 171.

ALTERNATE SPACER ASSEMBLY

Figure 7:
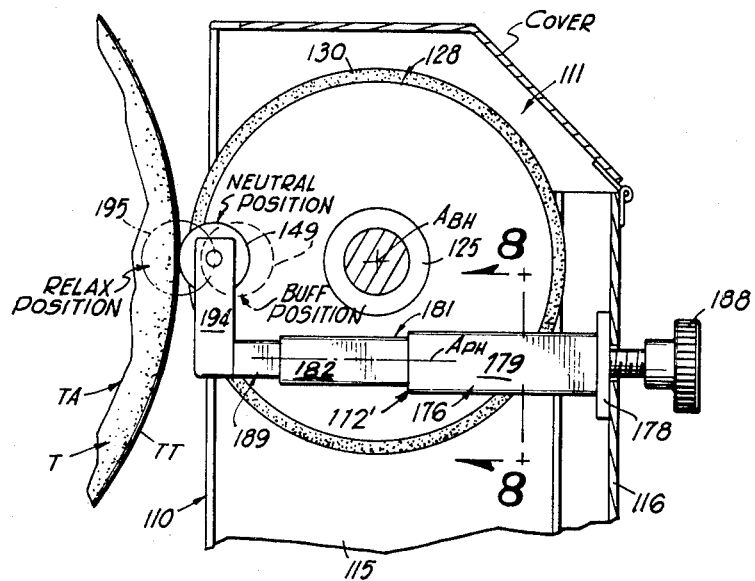
FIG. 7 is a view similar to FIG. 6 showing an alternate buffer spacer assembly.
Figure 9:
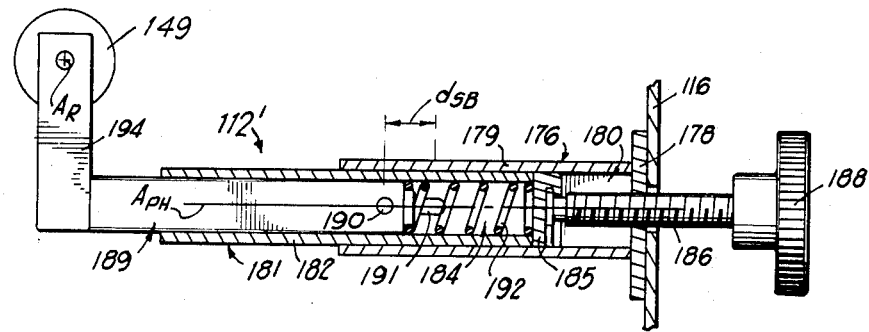
FIG. 9 is a longitudinal cross-sectional view taken along line 9—9 in FIG. 8.
Figure 8:
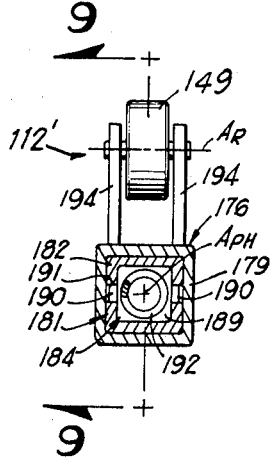
FIG. 8 is an enlarged transverse cross-sectional view taken along line 8—8 in FIG. 7.

FIGS. 7–9 illustrate an alternate spacer assembly which has been designated generally by the numeral 112'. This spacer assembly 112' operates in general principal similar to the spacer assembly 112. The spacer assembly 112' comprises generally a support housing 176 mounted on the back plate 116 just below the driven shaft 125 carrying the buffing rasps 128 and projects generally normal to the backing plate 116 and perpendicular to the buffing axis $A_{BH}$. The spacer assembly 112' is likewise centered under the driven shaft 125. The support housing 176 includes a mounting plate 178 mounted on the back plate 116 of the buffer arm assembly 110 and a tubular wall 179 (FIG. 9) generally rectilinear in cross-section which defines a positioning chamber 180 therein opening on the inboard end of the tubular wall 179. A positioning housing 181 (FIG. 9) is sized for slidable receipt in the positioning chamber 180 in the support housing 176 and also includes a tubular side wall 182 generally rectilinear in cross-sectional shape. The side wall 182 of the positioning housing 181 defines a spacer chamber 184 therein which opens onto the inboard end of the positioning housing 181 and which is closed at the outboard end of the positioning housing 181 by an attachment plate 185 as best seen in FIG. 9. The attachment plate 185 is rotatably connected to an adjustment screw 186 so that the positioning housing 181 will be axially moved along the positioning axis $A_{PH}$ which is the common centerline of the housing 176 and housing 181. The adjustment screw 186 is externally threaded and extends through the mounting plate 178 on the support housing 176 which is complimentary internally threaded so that, as the adjustment screw 186 is rotated, the positioning housing 181 will be axially moved within the support housing 176. A positioning handle 188 is carried on the adjustment screw 186 on the outboard end thereof projecting through the back plate 116 so that the adjustment screw 186 can be manually rotated. Spacer bar 189 having a generally rectilinear cross-sectional shape is slidably received in the positioning housing 181 for reciprocal movement along the axis $A_{PH}$. The axial movement of the spacer bar 189 is controlled by an abuttment pin 190 best seen in FIGS. 8 and 9 which extends through the spacer bar 189 at the outboard end thereof and which is slidably received in opposed elongate slots 191 in the tubular side wall 182 of positioning housing 181. This allows the spacer bar 189 to move the distance $d_{SB}$ seen in FIG. 9 with respect to housing 181. The abuttment pin 190 is sized so that the positioning housing 181 can slidably move within the support housing 176 without interference therewith. A compression coil spring 192 is positioned in the spacer chamber 184 between the outboard end of the spacer bar 189 and the attachment plate 185 on the outboard end of the positioning housing 181 while the inboard end of the spacer bar 189 is provided with a pair of upstanding support tabs 194 that mount the spacer roller 149 at the upper end thereof about roller axis $A_R$ which is generally parallel to the buffer axis $A_{BH}$. Thus, it will be seen that, when the spacer roller 195 contacts the tire tread TT, the spacer bar 189 will be forced into the positioning housing 181 as the buffer head assembly 111 is moved toward the tire tread TT. This causes the inboard end of the spacer bar 189 to compress the coil spring 192 to generate the reactive force enumerated hereinabove to offset the closing force on the buffer arm assembly 110 by the coil springs 171 in the buffer arm positioning assembly 114. This likewise causes a neutral point to be reached which is illustrated in FIG. 7 so that the tire tread TT is closely adjacent but not engaging the buffing surfaces 130 on the buffing rasps 128. The fully extended position of the spacer roller 149 is shown by a phantom line in FIG. 7 while the position of the spacer roller 149 is shown in buffing position in FIG. 7 by a dashed line. The overriding of the spring 192 by the fluid cylinder 165 is the same as that described hereinbefore.

It will be noted that the relative positions of the attachment tab 166 on the buffer arm assembly 110 and the attachment tab 169 on the loading arm assembly 60 as best seen in FIG. 10 are located such that, as the loading arm assembly 60 is pivoted clockwise as seen in FIG. 10, the attachment tab 169 is moved along a pivot path $P_{PA}$ which causes the buffer arm assembly 110 to be moved inwardly when the connection between the piston rod 168 and springs 171 on attachment tab 169 are raised above horizontal alignment with the connection between the fluid cylinder 165 and the coil springs 171 on the attachment tab 166. This allows the machine to be used on different size tires without appreciably effecting the operation of the machine since the further clockwise movement of the loading arm assembly 60 from the position seen in FIG. 10 when a smaller diameter tire T is on the machine causes the buffer arm assembly 110 to be automatically pivoted further counterclockwise inwardly toward the tire tread TT. This always assures that the coil spring assembly 170 in the buffer arm positioning assembly 114 will operate to maintain the spacer assembly 175 or 112 in contact with the tire tread TT.

It will be noted in FIG. 10 that the buffing rasps 128 in the buffer head assembly 111 engage the tire tread TT at a buffing position $P_B$ that is angularly shifted through the angle $\phi$ from the loading position $P_L$ of the loading drum 62. It will also be noted that the effective length $L_A$ of the loading arm assembly 60 and the effective length $L_{BA}$ of the buffing arm assembly 110 are about equal to each other and are considerably greater than the radius of the tires T with which the machine is to be used. Usually, the effective lengths $L_{LA}$ and $L_{BA}$ are at least about twice the radius of the maximum size tires T with which the machine is to be used. It will further be noted that the distance $L_{LP}$ from the drive spindle axis $A_{DS}$ to the loading arm pivot axis $A_{DA}$ is about equal to the distance $L_{BP}$ between the drive spindle axis $A_{DS}$ and the buffing arm pivot axis $A_{BA}$. The loading arm pivot axis $A_{DA}$ is located outboard of and intermediate a common flat buffing arm plane $P_{BA}$ (FIG. 10) extending through buffing unit axes $A_{BH}$ and $A_{BA}$. The axis $A_{DA}$ is also parallel to plane $P_{BA}$. The buffer arm pivot axis $A_{BA}$ is located outboard of and intermediate a common flat loading arm plane $P_{LA}$ (FIG. 10) extending through loading pivot axis $A_{DA}$ parallel to the upper edges of arm side members 68. The axis $A_{BA}$ is also parallel to plane $P_{LA}$, and the drum axis $A_D$ is both parallel to and movable toward and away from plane $P_{LA}$.

It will be appreciated that the spring 156 in the spacer assembly 112 and/or the spring 192 in the spacer assembly 112' can be replaced with any device which exerts a varying reactive force between the buffer arm assembly 110 and the tire tread TT where the spacing force increases as the buffer head assembly 111 moves toward engagement with the tire tread TT. An example of such device would be a closed cylinder with its piston rod acting against a compressible liquid. The spring assembly 170 in the positioning assembly 114 may likewise be replaced with any device which exerts a varying positioning force moving the buffer arm assembly 110 toward the tire tread TT where the positioning force decreases as the buffer head assembly 111 moves toward engagement with tire tread TT. As a matter of fact, as long as either the spacing force or the positioning force varies as set forth above, the other force may be constant as long as the neutral point is reached with the buffing rasps 128 closely adjacent to but out of engagement with the tire tread TT.

TIRE BALANCING MACHINE

The overall tire balancing machine is best seen in FIG. 18. The tire balancing machine 300 is commonly known as a two-plane balancer. This machine is a computerized balancer that dynamically balances tire assembly TA by electronically individually balancing opposed sides of the tire assembly TA. The machine 300 has a driving unit 301 which spins the wheel assembly TA for balancing. The driving unit 301 shown herein has a balancer drive spindle 302 as seen in FIGS. 19–21 rotatable about balancer spindle axis $A_{BS}$ which mounts the adapter 54 with the tire assembly TA so that the central axis of adapter 54 coincides with the spindle axis $A_{BS}$.

The drive spindle 302 has an abutment 304 (FIGS. 19-21) adjacent its inboard end. That portion of spindle 302 outboard of abutment 304 defines an exterior cylindrical adapter support surface 305 thereon concentric about the spindle axis $A_{BS}$ and with diameter $d_{DS}$ (FIG. 21). The support surface 305 has an effective length $L_{BS}$ (FIG. 21) as will become more apparent. The outboard end of the balancer spindle 302 has a reduced diameter, externally threaded engagement section 306 thereon to threadedly receive an internally threaded locking nut 308 thereon. The locking nut 308 defines a tapered cone surface 309 on the inboard end thereof (FIG. 20) which positively locates adapter 54 as will become more apparent and defines external wrenching surfaces 307 to tighten same.

A balancer drive key 310 (FIGS. 19-21) is mounted on spindle 302 just outboard of abutment 304 and projects outwardly through the support surface 305. The drive key axis $A_{BK}$ (FIG. 21) is parallel to spindle axis $A_{BS}$ and has a length $L_{BK}$. The drive key 310 has a constant exposed height $H_{BK}$ (FIG. 19) along its length but its side edges 311 taper outwardly from a minor width $W_{B1}$ (FIG. 21) at the outboard end 312 of key 310 to a major width $W_{B2}$ (FIG. 21) at its inboard end 314 as will become more apparent. The key 310 may be held in place by a roll pin 315 (FIG. 21). The drive key 310 operates in conjunction with nut 308 to positively locate adapter 54 on spindle 302 as will become more apparent.

TIRE MOUNTING ADAPTER

The tire assembly mounting adapter 54 is best seen in FIGS. 12-16 and serves to accurately locate the tire assembly TA alternatively on the buffer drive spindle 40 of buffing machine 10 (FIGS. 10 and 11) or on the balancer drive spindle 302 of the balancing machine 300 (FIGS. 18 and 19). In either case, the tire assembly TA is mounted so that its vehicle effective rotational axis coincides with the buffer spindle axis $A_{DS}$ of buffer drive spindle 40 or the balancer spindle axis $A_{BS}$ of the balancer drive spindle 302 and positively connects the tire assembly TA to buffer drive spindle 40 or balancer drive spindle 302. The mounting adapter 54 is mounted on the tire assembly TA before it is placed in the buffing machine 10 and/or balancing machine 300 since tire assemblies are relatively heavy, up to 100 lbs. normally, and can be much more easily positioned while they are not on the machines 10 or 300.

Figure 15:
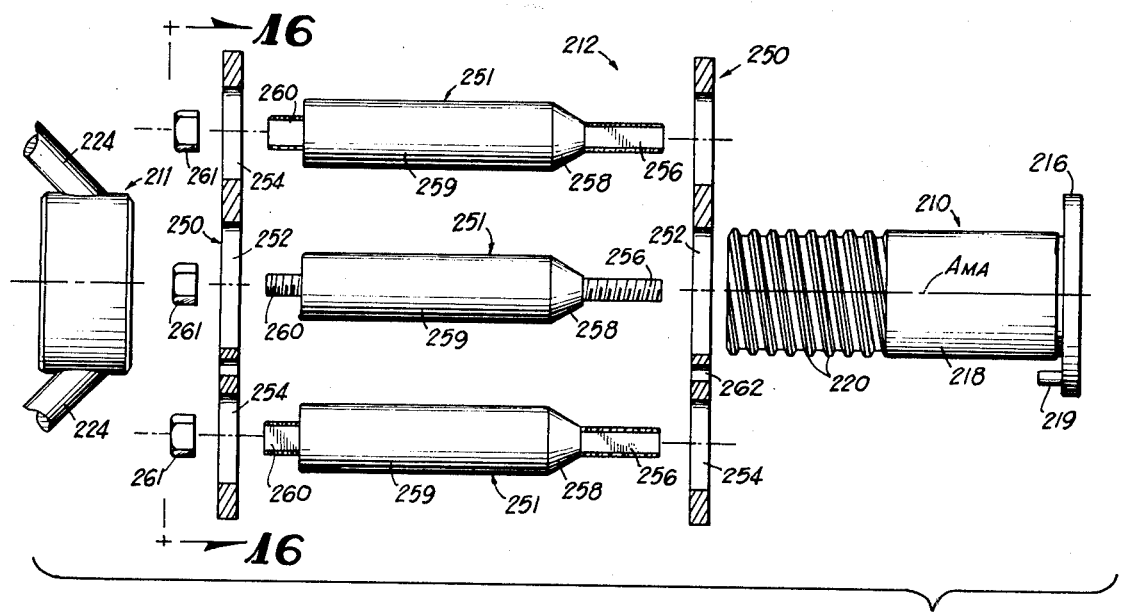
FIG. 15 is an enlarged exploded view similar to FIG. 12 with a different wheel mounting assembly.
Figure 16:
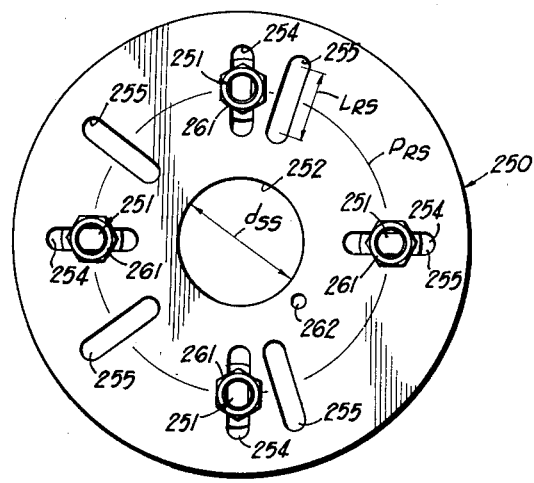
FIG. 16 is a face view taken along line 16—16 in FIG. 15 with the wheel mounting assembly assembled; and, FIG. 17 is a schematic diagram of the control circuit.

The mounting adapter 54 includes a support sleeve 210 (FIG. 12) which is alternatively received on the buffer drive spindle 40 of buffing machine 10 or balancer drive spindle 302 of balancing machine 300 to support the tire assembly TA and a locking nut 211 which holds the tire assembly TA on the support sleeve 210. A number of different wheel positioning assemblies 212 may be used with the support sleeve 210 and locking nut 211 to mount different kinds of wheel rims WR on the support sleeve 210. One type of wheel positioning assembly 212 is illustrated in FIGS. 12-14 and another type of wheel positioning assembly 212' is illustrated in FIGS. 15 and 16.

The support sleeve 210 includes a tubular side wall 214 with a central axis $A_{MA}$ which defines a central passage 215 therethrough concentric about axis $A_{MA}$ with a diameter $d_{AS}$ substantially equal to the diameter $d_{DS}$ of both the spindle 40 of buffing machine 10 and spindle 302 of balancing machine 300 so that the sleeve 210 will be slidably received over the spindle 40 or the spindle 302. The central passage 215 opens on opposite ends of the side wall 214. The inboard end of the side wall 214 is integral with an outwardly projecting arresting flange 216 to arrest the movement of the wheel positioning assemblies 212 and 212' along the outside bearing surface 218 of the side wall 214. The arresting flange 216 is oriented normal to the adapter axis $A_{MA}$. The arresting flange is provided with a locating pin 219 extending therethrough generally parallel to the adapter axis $A_{MA}$ and projecting from the arresting flange 216 outwardly along the tubular side wall 214. The inboard end of the tubular side wall 214 is externally threaded with threads 220 to be threadedly engaged by the locking nut 211 as will be explained. The side wall 214 is provided with a key slot 221 that extends axially thereof and opens into the central passage 215 as best seen in FIGS. 12-14. The key slot 221 has a constant width $W_{KS}$ (FIGS. 14 and 20) along its length and a depth $D_{KS}$ (FIGS. 12 and 19) along its length. The slot 221 is positively engaged by key 58 on buffer drive spindle 40 and by key 310 on balancer drive spindle 302 to positively connect adapter 54 and thus tire assembly TA to the spindle 40 or 302 so that the tire assembly TA will be positively rotated therewith. The width $W_{KS}$ is about equal to the width $W_{DK}$ of buffer key 58 so that the support sleeve 210 can be slipped over the buffer drive spindle 40 with the central passage 215 in support sleeve 210 over spindle 40 and the drive key 58 projecting into key slot 221 to cause the drive spindle 40 to positively drive the support sleeve 210.

It will further be seen in FIGS. 20 and 21 that the width $W_{KS}$ of key slot 221 is greater than the outboard minor width $W_{B1}$ of the balancer key 310 on balancer drive spindle 320 but less than it inboard major width $W_{B2}$. When support sleeve 210 is slipped over the balancer drive spindle 302 with the central passage 215 in support sleeve 210 about the support surface 305 on spindle 302 (FIG. 20), the inboard end 312 of balancer drive key 310 will extend into slot 221. Because the inboard width $W_{B2}$ is wider than slot 221, however, opposite sides of slot 221 will wedge onto the outwardly flared side edges 311 (FIG. 20) to arrest the movement of sleeve 210 and prevent any loose motion between the inboard end of sleeve 210 and balancer spindle 302. It will further be noted in FIG. 20 that the outboard end of sleeve 210 is provided with a tapered countersink surface 213 about the end of central passage 215 through sleeve 210. The countersink surface 213 is complimentary to the cone surface 309 on balancer locking nut 308 so that when balancer locking nut 308 is screwed onto the engagement section 306 on balancer spindle 302 (FIG. 20), the cone surface 309 on nut 308 engages countersink surface 213 on sleeve 210 to maintain the outboard end of sleeve 210 concentric with spindle axis $A_{BS}$ and the balancer key 310 in engagement with slot 221 in sleeve 210. This locks sleeve 210 onto spindle 302 with the sleeve axis $A_{MA}$ coinciding with spindle axis $A_{BS}$ (FIG. 20). The outside bearing surface 218 on support sleeve 210 has an outside diameter $d_{SS}$. This outside bearing surface 218 is concentric about the sleeve axis $A_{MA}$ and slidably mounts the positioning assembly 212 or 212' thereon.

Figure 12:
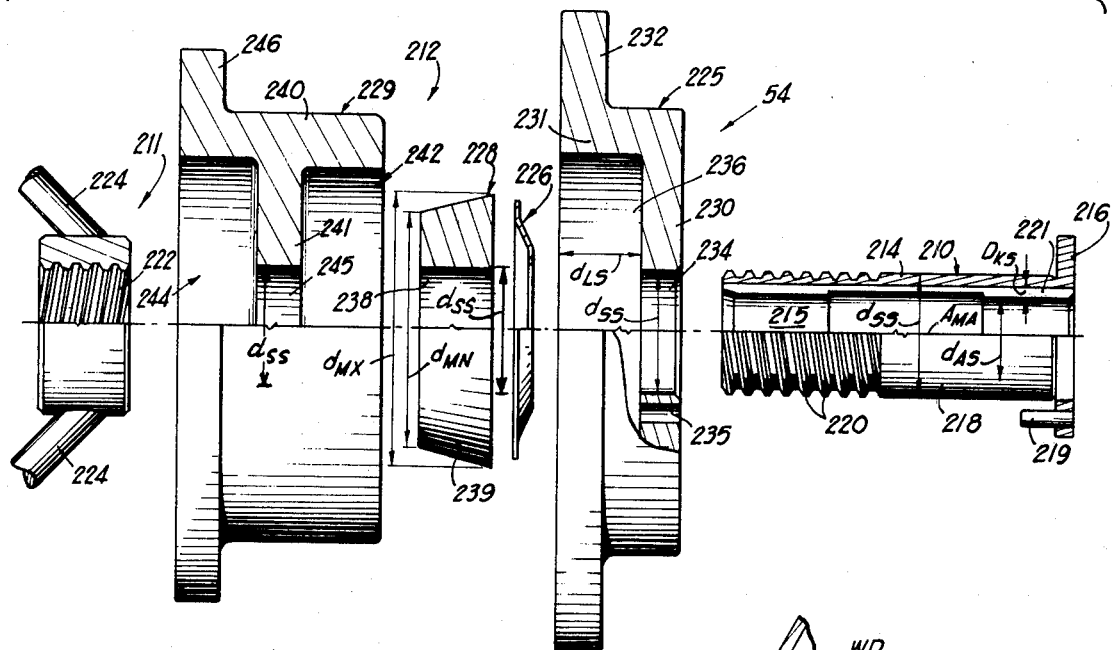
FIG. 12 is an enlarged exploded view of an adapter assembly to mount the tire assembly on the machine.
Figure 13:
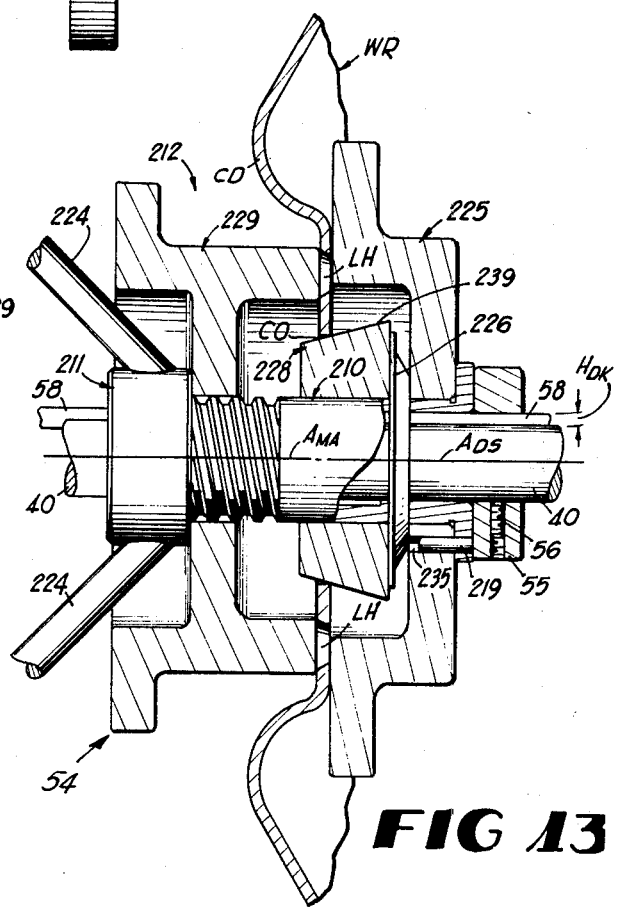
FIG. 13 is a view similar to FIG. 12 with the adapter assembly assembled.

The locking nut 211 is internally threaded as seen in FIG. 12 with nut threads 222 sized to threadedly engage the threads 220 on the outboard end of the support sleeve 210 so that the locking nut 211 can be screwed onto the outboard end of the support sleeve 210. The locking nut 211 is provided with a pair of outwardly extending forwardly angled handles 224 so that the handle 224 can be manually grasped to screw the locking nut 211 onto the support sleeve 210 quickly and easily.

The wheel positioning assembly 212 seen in FIGS. 12-14 includes a backup plate 225, spring washer 226, a locating cone 228 and a clamp ring 229. The backup plate 225 is a cup shaped member which has a circular inboard end wall 230 integral with a cylindrical extending edge flange 231 along its outboard edge concentric with axis $A_{MA}$. The edge flange 231 is in turn integral with an outboard annular flange 232 around its outboard end so that the outboard flange 232 is generally normal to the adapter axis $A_{MA}$ when the backup plate 225 is positioned on the sleeve 210. A central hole 234 is provided through the inboard wall 230 with a diameter $d_{SS}$ so that the backup plate 225 will be slidably received onto the outside bearing surface 218 of the support sleeve 210. A locating hole 235 is also provided through the inboard wall 230 which is registrable with the locating pin 219 in the arresting flange 216 on the support sleeve 210 so that the backup plate 225 is positively connected to the support sleeve 210. An outboard locating recess 236 is bounded by inboard end wall 230 and the edge flange 231 with a prescribed depth $d_{LS}$ as will become more apparent.

The spring washer 226 is an annular spring member with an offset therein so that the washer will exert an axial force along the adapter axis $A_{MA}$ when it is placed on the support sleeve 210. The spring washer 226 is positioned in the locating recess 236 so that it bears against the outboard side of the inboard wall 230 as seen in FIG. 13.

The locating cone 228 is an annular member defining a locating hole 238 centrally therethrough with a diameter $d_{SS}$ slidably receiveable over the bearing surface 218 of the support sleeve 210. The locating cone 228 defines a tapered locating surface 239 therearound concentric about the axis $A_{MA}$ which tapers inwardly from a maximum diameter $d_{MX}$ at its inboard end to a minimum diameter $d_{MN}$ at its outboard end. The locating cone 228 is positioned on the support sleeve 210 so that its inboard end rests on the spring washer 226 as seen in FIG. 13. When the wheel rim WR is positioned adjacent the outboard surface of the backup plate 225 with its central opening CO through the central disk CD around the locating surface 239 on the locating cone 228 as seen in FIG. 13, the locating surface 239 will locate the wheel by the central opening CO so that the effective rotational axis of the tire assembly TA coincides with the adapter axis $A_{MA}$ if the central opening CO in the wheel rim WR is at its true center. Different size cones 228 are normally provided.

The clamp ring 229 includes an annular side wall 240 concentric about the axis $A_{MA}$. A central web 241 is integral with the side wall 240 intermediate its ends and arranged normal to the axis $A_{MA}$ so as to form a cone recess 242 in the inboard end of the clamp ring 229 and a nut recess 244 in the outboard end of the clamp ring 229. The central web 241 defines a locating hole 245 therethrough with diameter $d_{SS}$ to be carried on the support sleeve 210. The outboard end of the side wall 240 is integral with an annular outwardly directed flange 246 generally normal to the axis $A_{MA}$. This allows the clamp ring 229 to be reversed to clamp different size wheel rims WR onto the adapter 54.

As seen in FIG. 13, the clamp ring 229 is slipped over the support sleeve 210 so that the inboard end thereof engages the outboard side of the wheel rim WR about the central opening CO and then the locking nut 211 is screwed onto the threads 220 on the support sleeve 210 to urge the clamp ring 229 toward the backup plate 225. The spring washer 226 and the maximum and minimum diameters $d_{MX}$ and $d_{MN}$ of the locating surface 239 on the locating cone 228 are sized so that the locating surface 239 on the cone 228 will engage the central opening CO through the wheel rim before the clamp ring 229 forces the inboard side of the wheel rim WR into contact with the outboard side of the backup plate 225. Thus, it will be seen that the locating surface 239 maintains central opening CO concentric about the adapter $A_{MA}$ so that when the adapter 54 with the tire assembly TA mounted thereon is slipped over the buffer drive spindle 40 as seen in FIG. 13 or the balancer drive spindle 302 as seen in FIG. 19, the tire assembly TA will be mounted with its effective rotational axis concentric with the buffer spindle axis $A_{DS}$ or the balancer spindle axis $A_{BS}$. The stop collar 55 on buffer spindle 40 is adjusted so that the central tread plane $P_{VT}$ of the tire assembly TA is laterally aligned with the center of the driven shaft 125 on the buffer unit 15 seen in FIG. 5 which also aligns the plane $P_{VT}$ with the midpoint of the loading drum 62 on the loading unit 14 seen in FIG. 11.

Where the central opening CO through the central disk CD of the wheel rim WR is not concentric about the true rotational axis of the tire assembly TA, the wheel positioning assembly 212' illustrated in FIGS. 15 and 16 may be used. It will be noted that the lug holes LH (FIG. 13) in the wheel rim WR are always concentrically located about the effective rotational axis of the tire assembly TA and these lug holes LH are used to mount the wheel rim WR on the support sleeve 210 by the positioning assembly 212'. The positioning assembly 212' includes a pair of slot adapter plates 250 and a plurality of adapter studs 251 which cooperate with the slot adapter plates 250 to locate the tire assembly TA on the support sleeve 210 and are held in position by the locking nut 211.

Each of the slot adapter plates 250 is circular and is provided with a central locating hole 252 of diameter $d_{SS}$ so that when both of the plates 250 are slidably received on the support sleeve 210, they are oriented generally normal to the adapter axis $A_{MA}$ and concentric therewith. Each adapter plate 250 with a first set of radially extended slots 254 and a second set of radially extending slots 255. The slots 254 are used to mount a four lug wheel rim wheel the slots 255 are used to mount a five lug wheel rim. Thus, the slots 254 are located 90° apart while the slots 255 are located 72° apart. Other than the spacing, the slots 254 and 255 are identical. Each of the slots 254 and 255 have an effective length $L_{RS}$ and are centered on a circular path $P_{RS}$ so that the slots 254 and 255 can be aligned with any lug hole circle on the wheel rim WR.

The adapter studs 251 each have a locating projection 256 on the inboard end thereof with flat sides thereon so that the studs 251 are prevented from turning when they project through the slots 254 or 255 in the inboard adapter plate 250. Immediately outboard of the locating projections 256 is a tapered locating section 258 which engages the tapered lug hole LH in the wheel rim WR. Each stud 251 includes a cylindrical main body 259 immediately outboard of the locating section 258. The outboard end of the main body 259 is provided with a threaded mounting section 260 which also has flattened sides so that when the sections 260 are provided through the slots 254 or 255 in the outboard plate 250, the studs 251 are prevented from rotating. Appropriate nuts 261 may be provided to threadedly engage the mounting sections 260 to locate the studs 251 on the outboard plate 250 are illustrated in FIG. 16. It will also be noted that at least the inboard adapter plate 250 is provided with a locating hole 262 which positively connects the inboard plate 250 to the support sleeve 210 by the locating pin 219. Thus, when the wheel rim WR is placed on the outboard side of the inboard adapter plate 250 and rotated so that the lug holes LH line up with the slots 254 or 255, the studs 251 can then be inserted through the lug holes into the slots 254 or 255 in the inboard adapter plate 250 in registration with the lug holes LH. The studs 251 may either be already attached to the outboard plate 250 or outboard plate 250 subsequently attached thereto. This inherently centers the tire assembly TA about the adapter axis $A_{MA}$ so that the effective rotational axis of the tire assembly TA coincides with the adapter axis $A_{MA}$ and will coincide with the buffer spindle axis $A_{DS}$ when the adapter 54 with the tire assembly TA mounted thereon is placed on the buffer spindle 40 or with the balancer spindle axis $A_{BS}$ when the adapter 54 with tire assembly TA mounted thereon is placed on the balancer spindle 302.

CONTROL CIRCUIT

Figure 17:
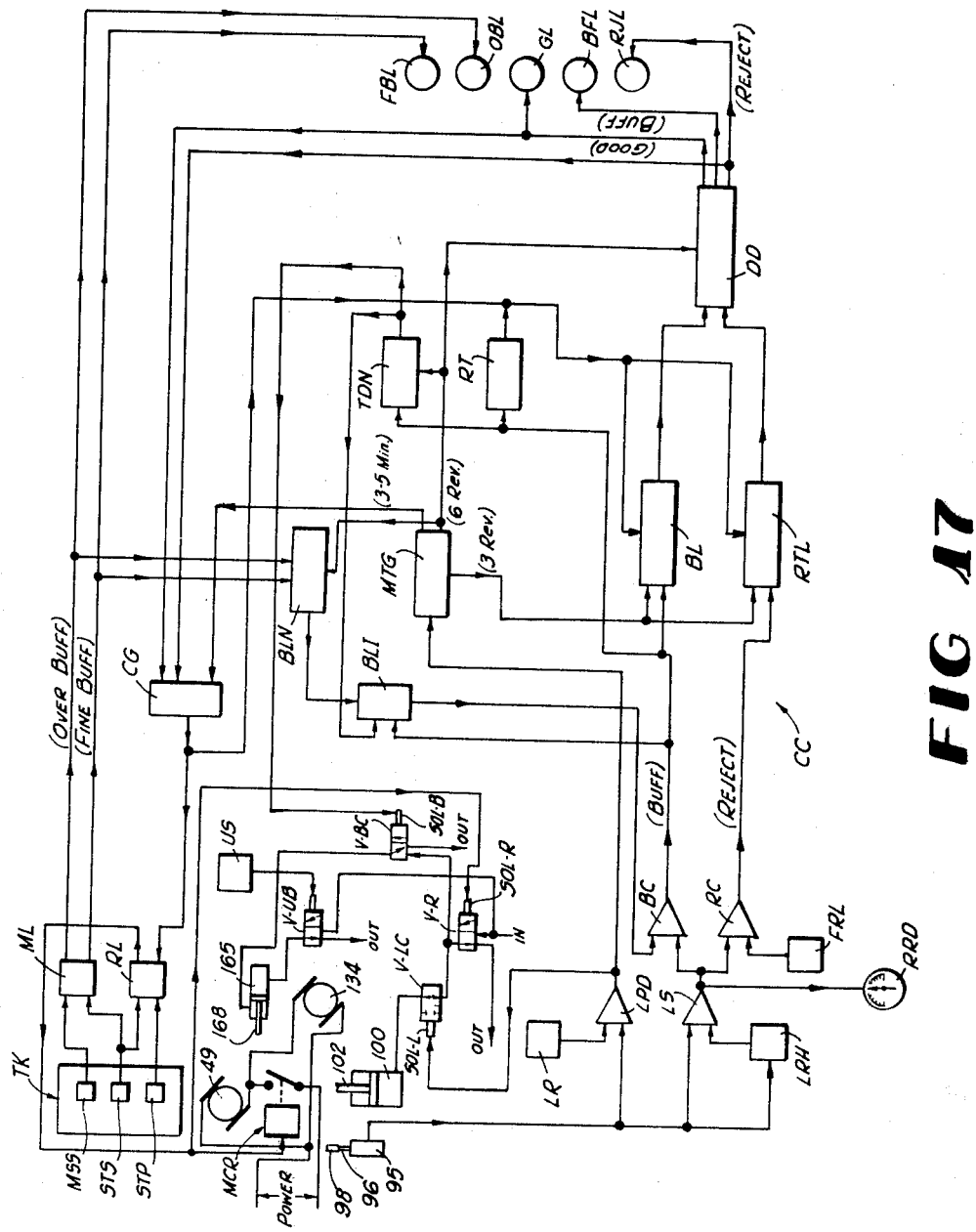

The machine 10 is controlled by a control circuit CC best seen in FIG. 17. The inputs to the control circuit CC are provided by the displacement transducer 95 on the loading unit 14 and a touch keyboard TK. The keyboard TK includes a stop switch STP, a start switch STS and a mode selector switch MSS. The output of the transducer 95 is connected to a lock point detector LPD, a linear summer LS and a low reference hold LRH. The output of the lock point detector LPD is connected to a mode timing generator MTG and to the lock solenoid Sol-L on the loading cylinder lock valve V-LC. The output of the linear summer LS is connected to a buff comparator BC, a reject comparator RC and a radial runout display RRD to visually indicate the amount of loaded radial runout. The output of the low reference hold LRH is also connected to the linear summer LS. The start switch STS and stop switch STP control a run latch RL. The mode selector switch MSS and start switch STS control a mode latch ML. The lock point detector LPD is controlled by a load reference LR and the reject comparator RC is controlled by a fixed reject limit FRL. One output (6 revolutions) of the mode timing generator MTG is connected to a buff level network BLN, to a decoder driver DD and to a time delay network TDN. Another output (3 revolutions) of the mode timing generator MTG is connected to the buff latch BL and the reject latch RTL. Another output (3-5 minutes) of the mode timing generator MTG is connected to a control gate CG. The buff level network BLN is controlled by the outputs of the mode latch ML to set the radial runout level to which the tire assembly is to be buffed. The "over buff" output from latch ML may also drive an "over buff" lamp OBL and the "fine buff" output of latch ML may also drive a "fine buff" lamp FBL. The output of the buff level network BLN controls the buff comparator BC through buff level inhibit network BLT. The output of the reject comparator RC controls the reject latch RTL. The output of the buff comparator BC is connected to the buff latch BL, a revolution timer RT and time delay network TDN. The output of the buff comparator BC also provides the control feedback to network BLI. The output of the time delay network TDN is connected to the buff solenoid Sol-B on the buffing cylinder valve V-BC and also provides the enabling control signal to buff level inhibit network BLI. The output of the revolution timer RT is connected to the reset inputs on the buff latch BL and the reject latch RTL. The outputs of the buff latch BL and reject latch RTL control the output state of the decoder driver DD. The "reject" output of the decoder driver DD is connected to the control gate GG and may control a "reject" lamp RJL. The "buff" output of the decoder driver DD may control a "buff" lamp BFL. The "good" output of the decoder driver DD is connected to the control gate CG and may control a "good" lamp GL. The output of control gate CG controls the run latch RL. The output of the run latch RL controls the run solenoid Sol-R of the run valve V-R to supply pressure to valve V-LC and V-BC, and also controls the motor control relay MCR. A manually operable unload switch US may be connected to the unloading solenoid Sol-U on a buffer unloading valve V-UB to extend piston rod 168 on cylinder 165 to insure that the buffer unit 15 is fully open. Usually, the geometry of the loading arm pivot $A_{DA}$ and buffer arm pivot $A_{BA}$ is such that the opening of loading unit 14 opens buffer unit 15 sufficiently in order that valve V-UB need not be used.

OPERATION

In operation, it will be seen that the operator mounts the tire assembly TA on the adapter 54 while the adapter is off of machine 10 so that the effective rotational axis of the tire assembly TA coincides with the adapter central axis $A_{MA}$ (FIGS. 13 and 15). After the tire assembly TA is mounted on the adapter 54, the operator slides the adapter 54 with tire assembly TA thereon onto drive spindle 40 with the inboard end of sleeve member 210 first until the inboard end of sleeve member 210 contacts the locking collar 55 (FIGS. 11 and 13). The locking collar 55 has been adjusted so that the tire assembly TA is positioned as seen in FIGS. 10 and 11.

The operator now depresses the start switch STS which starts the automatic operation of machine 10. Closing switch STS enables the run latch RL thereby energizing the solenoid Sol-R and transfers valve V-R to supply fluid under pressure to the closed end of load cylinder 100 through lock valve V-LC. This extends piston rod 102 from load cylinder 100 to pivot loading arm assembly 60 clockwise as seen in FIG. 10 to raise the loading drum 62 into contact with the tire tread TT as seen in FIGS. 10 and 11. At the same time, run latch RL closes the motor control relay MCR (FIG. 17) to start the spindle drive motor 49 in drive unit 12 (FIG. 11) and the buffer drive motor 134 in the buffer unit 15 (FIG. 10). Motor 49 starts rotating the tire assembly TA counterclockwise in FIG. 10 at a prescribed speed, usually about 15-20 rpm through the key 58 on drive spindle 40 and the drive pin 219 (FIG. 13) on the sleeve member 210 of adapter 54 while motor 134 rotates the buffing rasps 128 counterclockwise as seen in FIG. 10 at a sufficient speed to properly buff the tire tread, usually about 3000-4000 rpm. The tire tread TT urges the drum 62 and yoke assembly 61 counterclockwise upon contact of drum 62 with tread TT as seen in FIG. 10 as the loading arm assembly 60 continues to move clockwise in FIG. 10. This compresses springs 91 in spring assembly 90 and eventually moves the drive pin 98 on yoke assembly 61 into engagement with the operating plunger 96 on transducer 95 to move plunger 96 downwardly in FIGS. 10 and 11 and generate an appropriate output from transducer 95. When the output of the transducer 95 reaches the preset output of the load reference LR (usually about 0.07 inch plunger 98 movement) (FIG. 17), the lock point detector LPD changes state to energize lock solenoid Sol-L and transfer the lock valve V-LC so that the fluid in cylinder 100 is locked therein. The load unit 14 is now in the position seen in FIGS. 10 and 11.

The clockwise movement of loading arm assembly 60 also pivots the buffer arm assembly 110 counterclockwise inwardly toward the tire as seen in FIG. 10 so that the spacer roller 149 in spacer assembly 112' engages the tire tread TT. When the tire tread TT engages the roller 149 on spacer assembly 112' tread TT prevents further movement of the roller 149 with the buffer arm assembly 110 toward the tire tread. The contact between the tire tread TT and roller 149 occurs prior to the loading arm assembly 60 reaching its locked loaded position seen in FIG. 10. As the loading arm assembly 60 continues to move clockwise in FIG. 10 toward its loaded position, the spring assembly 170 in positioning assembly 114 connecting the buffer arm assembly 110 with the loading arm assembly 60 moves the buffing arm assembly 110 further toward the tire tread TT. As the coil spring assembly 170 continues to move the buffer arm assembly 110 counterclockwise as seen in FIG. 10, the tire tread TT forces the spacer bar 189 into the positioning housing 181 on spacer assembly 112' to compress spring 192 (FIG. 9) in housing 181 and generate a reactive force trying to force the buffer arm assembly 110 clockwise away from the tire tread TT. Because this reactive force increases as the buffer arm assembly 110 moves toward the tire tread TT to further compress the spring 192 in spacer assembly 112', a neutral position (FIGS. 7 and 10) will be reached when the loading arm assembly is in its locked position where the reactive force on buffer arm assembly 110 by the spacer assembly 112' equals the closing force on buffer arm assembly 110 by the spring assembly 170 in positioning assembly 114. The movement of the buffer arm assembly 110 thus stops in this neutral position as long as the closing and reactive forces on the buffer arm assembly remain equal. The position of housing 181 with respect to support housing 176 of spacer assembly 175 is adjusted via handle 188 (FIG. 10) so that the buffing surfaces 130 on buffing rasps 128 are located closely adjacent to, but not in engagement with, the shoulders on the tire tread TT when the neutral position is reached (FIGS. 7 and 10). The spacer assembly 112 (FIGS. 5 and 6) would also position the rasps 128 in a similar neutral position.

The tire assembly TA is now radially loaded by the loading drum 62 and the buffer unit 15 is in neutral position ready for buffing. Because the loading drum 62 is freely rotatable about axis $A_D$, the drum 62 can rotate with tread TT as tire assembly TA is positively driven by the drive unit 12 to rotate the tread TT first past the loaded point $P_L$ and then past the buffing point $P_B$ (FIG. 10). While different radial loads may be applied to the tire assembly TA by loading unit 14, about a 1,000 pound load usually approximates the radial load on the tire assembly TA when it is mounted on a vehicle.

The control circuit CC (FIG. 17) automatically causes the machine to first go through a stabilizing period and then through a determination period to determine the state of loaded radial runout in the tire assembly TA. If the circuit determines that the loaded radial runout is in the acceptable range or that the loaded radial runout is in the reject range above the range which can normally be corrected, then the machine 10 is shut down for tire assembly TA to be unloaded with the loading unit 14 and buffing unit 15 returning to their open positions. If, on the other hand, the circuit CC determines that the loaded radial runout is in the correctable range (i.e. greater than acceptable range but less than the reject range), then the circuit CC automatically goes into the correction period to reduce the loaded radial runout into the acceptable range. For sake of clarity the stabilizing, determination and correction periods will be described separately.

STABILIZING PERIOD

The change of state in the output of the lock point detector LPD (FIG. 17) when the tire assembly TA becomes radially loaded starts the mode timing generator MTG. At the same time, the output of the transducer 95 (FIG. 17) is being fed to the linear summer LS and low reference hold LRH. The signal from transducer 95 to low reference hold LRH drives the output from the low reference hold LRH to linear summer LS to the lowest loaded radial runout output from transducer 95 to establish a "zero" reference point. At the drive unit 12 (FIG. 11) continues to rotate tire assembly TA over the loading drum 62, the "zero" output from low reference hold LRH is subtracted from the output of transducer 95 by the linear summer LS so that the output of the linear summer LS is representative of the actual loaded radial runout of the tire assembly TA at the loaded position $P_L$. The actual loaded radial runout from summer LS is displayed on the radial runout display RRD and is also fed to the buff comparator BC and reject comparator RC.

The buff comparator BC compares the actual radial run-out from linear summer LS with the buff set point from the network BLN and changes its output state if the actual radial runout exceeds the buff set point to generate a buff signal output to the buff latch BL. The buff latch BL is, however, disabled by the generator MTG until the tire assembly TA has rotated about three revolutions after loading to assure accuracy.

The reject comparator RC, on the other hand, compares the actual loaded radial runout from linear summer LS with the reject set point from the fixed reject limit FRL and changes its output state if the actual radial runout exceeds the reject set point to generate a reject signal output to the reject latch RTL. The reset latch RTL, however, is also disabled by the generator MTG until the tire assembly TA has rotated about three revolutions after loading to assure accuracy.

DETERMINATION PERIOD

After the tire assembly TA has rotated about three revolutions, the mode timing generator MTG (FIG. 17) enables both the buff latch BL and the reject latch RTL and the tire assembly TA continues to rotate. If a buff signal output from buff comparator BC is received by buff latch BL, it is latched to change its output state and generate a buff latch signal output to the decoder driver DD. Likewise, if a reject signal output from reject latch RTL, it is latched to change its output state and generate a reject latch signal output to decoder driver DD. Until the tire assembly TA has rotated about six revolutions after loading, the decoder driver DD is disabled by generator MTG.

It will also be noted that each time a buff signal output is generated by buff comparator BC the revolution timer RT is started and the buff signal output is fed to time delay network TDN. The revolution timer RT times out after about one revolution of the tire assembly TA without a buff signal being generated by comparator BC to reset the latches BL and RTL to prevent over buffing as will become apparent. The time delay network TDN is disabled by generator MTG to prevent buffing of tire tread TT until the tire assembly TA has rotated about six revolutions after loading.

After the tire assembly TA has rotated about six revolutions after loading, the decorder driver DD is enabled by generator MTG. The outputs of the decoder driver DD then change in accordance with the inputs thereto from buff latch BL and reject latch RTL. If no buff latch signal output is received from latch BL and no reject latch signal output is received from reject latch RTL, then the loaded radial runout of the tire assembly TA is acceptable and the "good" output from decoder driver DD (FIG. 17) changes state to illuminate "good" lamp GL and cause control gate CG to disable the run latch RL to shut the machine 10 down and open the loading unit 14 thereby opening the buffer unit 15. If, on the other hand, a buff latch signal output is received from buff latch BL and a reject latch signal output is received from reject latch RTL, then the loaded radial runout of the tire assembly TA is not readily correctable and the "reject" output from decoder driver DD changes state to illuminate "reject" lamp RJL and cause control gate CG to disable run latch RL to shut machine 10 down and open the loading unit 14 thereby opening the buffer unit 15. When a buff latch signal output is received from buff latch BL but no reject latch signal output is received from reject latch RTL, the "buff" output from the decoder driver DD changes state to illumitate "buff" lamp BFL to indicate that the tire assembly TA needs correcting and the loaded radial runout is in the correctable range. It will be noted that the "buff" output from decoder driver DD does not cause the control gate CG to disable run latch RL so that the machine 10 goes into its correction period.

CORRECTION PERIOD

When the decoder driver DD is enabled by the mode timing generator MTG, the generator MTG also enables the time delay network TDN and also causes the buff level network BLN to lower its set point output during the correction period to assure repeatability. As the tire assembly TA continues to rotate, the buff signal output from the buff comparator BC to time delay network TDN is delayed in the time delay network TDN until that portion of the tire tread TT at load position $P_L$ generating the buff signal output has rotated to the vicinity of the buff position $P_B$. At that time, the time delay network TDN generates a buff signal to the buff solenoid Sol-B to transfer valve V-BC (FIG. 17). This retracts piston rod 168 into cylinder 165 in positioning assembly 114 (FIGS. 10 and 17) to force buffer arm assembly 110 counterclockwise in FIG. 10 to overcome the action of spacer assembly 112' and force the buffing surfaces 130 on rasps 128 into contact with that portion of the tread TT with correctable loaded radial runout now located at buff position $P_B$. It will be noted that the cylinder 165 will apply a substantially constant buffing force to the buffer arm assembly 110 as long as the fluid line pressure is about constant and that the depth of the buffing of the tread TT by rasps 128 is not controlled. However, the buffing force is sufficiently low to prevent significant excessive buffing. When the output of buff comparator BC drops back to its "no-buff" state, this "no-buff" signal output is delayed in time delay network TDN and then de-activates solenoid Sol-B to transfer valve V-BC back to its de-activated position and bleed the fluid from cylinder 165. This allows the spacer assembly 112' and the positioning assembly 114 to move the rasps 128 and buffer arm assembly 110 back to their neutral position with the buffing surfaces 130 out of engagement with the shoulders of tire tread TT (FIGS. 7 and 10). This operation is repeated on each buff signal output from comparator BC.

While the buffing surfaces 130 on rasps 128 (FIG. 10) are forced into buffing engagement with the tire assembly TA, it has been found that the buffing force distorts the actual loaded radial runout signal, usually by artificially raising the magnitude of the output from transducer 95. This distortion is compensated for by the buff level inhibit network BLI (FIG. 17). The buff signal from the time delay network TDN that energizes solenoid Sol-B also causes the buff level inhibit network BLI to raise the buff set point output from buff level network BLN to a level which offsets the distortion in the actual loaded radial runout output from summer LS and assure accuracy. As the tire tread TT is buffed sufficiently to approach the acceptable radial runout range, the distortion in the loaded radial runout output from linear summer LS when the rasps 128 engage the tire tread TT may be reduced. This may cause the output of the buff comparator BC to inappropriately change back to its "no buff" state. To prevent this from occuring, the "no buff" output of the buff comparator BC may be used to disable the buff level inhibit network BLI when it shifts back to its "no buff" state.

The revolution timer RT resets the buff latch BL after a complete revolution of the tire assembly TA without a buff signal output being generated from buff comparator BC. This indicates that the tire assembly TA has been buffed into the acceptable runout range to cause the decoder driver DD to terminate its "buff" output and generate a "good" output to illuminate "good" lamp GL and cause the control gate CG to change state and shut the machine down to complete the buffing operation. If the buffing operation has not been completed in 3-5 minutes, however, generator MTG will cause the control gate CG to change state to stop the operation of the machine 10.

The set point output from buff level network BLN may by manually changed through mode selector switch MSS and mode latch ML at any time during machine operation. For instance, manipulation of switch MSS to cause latch ML to generate an "over buff" output will select a higher set point output from buff level network BLN to comparator BC and illuminate "over buff" lamp OBL. On the other hand, manipulation of switch MSS to cause latch ML to generate a "fine buff" output will select a lower set point output from buff level network BLN to comparator BC and illuminate "fine buff" lamp FBL. The machine 10 will operate in either of these modes similarly to the normal mode described above except that the tire assembly TA will be buffed to the particular set point level.

The permissible loaded radial runout range in the tire assembly TA is determined by the particular construction of the tire T and/or the vehicle suspension system with which the tire assembly TA is to be used. While the permissible range may vary, a permissible loaded radial runout range less than 0.02 inch is normally acceptable. The reject limit in the loaded radial runout of tire assembly TA is established by the permissible amount of tread that may remain after correction to permit a reasonable tread life and is usually about 0.08 inch of loaded radial runout. Thus, the fixed reject limit FRL is set at about 0.080 inch loaded radial runout, the normal set point in network BLN is about 0.020 inch loaded radial runout, the "over buff" set point in network BLN is about 0.050 inch loaded radial runout, and the "fine buff" set point in network BLN is about 0.016 inch loaded radial runout. The particular selected set point in buff level network BLN used during the stabilizing and determination periods are lowered about 0.004 inch during the correction period to assure reliability of correction.

what is claimed as invention is:

1. A tire balancing machine for balancing a tire assembly having an inflated pneumatic tire mounted on a vehicular wheel rim with an effective axis of rotation comprising:

a balancer drive spindle rotatable about a balancer spindle axis;

balancer drive key means fixedly mounted on and rotatable with said balancer drive spindle;

a tire assembly mounting adapter removably mounting the tire assembly thereon independently of said balancer drive spindle and having an adapter central axis for fixedly yet removably mounting the tire assembly thereon so that the effective axis of rotation of the tire assembly coincides with the adapter central axis, said adapter including drive means for engaging the tire assembly while the tire assembly is mounted on said adapter for maintaining a fixed rotational position of the tire assembly relative to said adapter, said adapter defining a spindle receiving passage therethrough concentric about said adapter central axis so that said balancer drive spindle is slidably receivable therethrough to removably mount said adapter with the tire assembly thereon on said balancing machine with the adapter central axis coinciding with said balancer spindle axis, and said adapter including key engaging means for engaging said balancer drive key means when said adapter is mounted on said balancer drive spindle; and adapter locking means for selectively engaging said balancer drive spindle and said tire mounting adapter to force said key engaging means on said tire mounting adapter into engagement with said balancer drive key means, said balancer drive key means and said key engaging means constructed and arranged so that engagement between said balancer drive key means and said key engaging means maintains said tire mounting adapter fixed axially along the length of said balancer drive spindle and fixed rotationally with respect to said balancer drive spindle.

2. A tire balancing machine for balancing a tire assembly having an inflated pneumatic tire mounted on a vehicular wheel rim with an effective rotational axis comprising:

a balancer drive spindle rotatable about a balancer spindle axis;

balancer drive key means including a balancer drive key member fixedly mounted on and rotatable with said balancer drive spindle; and a tire assembly mounting adapter having an adapter central axis for fixedly yet removably mounting the tire assembly thereon so that the effective axis of rotation of the tire assembly coincides with the adapter central axis, said adapter including drive means for engaging the tire assembly while the tire assembly is mounted on said adapter for maintaining a fixed rotational position of the tire assembly relative to said adapter, said adapter defining a spindle receiving passage therethrough concentric about said adapter central axis so that said balancer drive spindle is slidably receivable therethrough to removably mount said adapter with the tire assembly thereon on said balancing machine with the adapter central axis coinciding with said balancer spindle axis, and said adapter including key engaging means for engaging said balancer drive key means when said adapter is mounted on said balancer drive spindle for maintaining a fixed rotational position between said adapter and said balancer drive spindle, said key engaging means including a key engaging slot having a substantially constant width along its length defined in said adapter and opening into said spindle receiving passage; said drive key member being tapered so that said drive key member will slidably fit into said key engaging slot to positively locate said tire assembly mounting adapter on said balancer drive spindle.

3. The tire balancing machine of claim 2 further including adapter locking means for selectively locking said tire assembly mounting adapter on said balancer drive spindle while said key engaging means is engaging said balancer drive key means for maintaining a fixed rotational position between said adapter and said balancer drive spindle.

4. The tire balancing machine of claim 2 wherein said tire assembly mounting adapter includes a support member defining said spindle receiving passage therethrough and said key engaging slot therein; a wheel positioning assembly adapted to be removably mounted on said support member; and a positioning locking member for selectively engaging said support member to fixedly yet removably mount said wheel positioning assembly on said support member, said support member further including abutment means thereon engaging said wheel positioning assembly in opposition to said positioning locking member to limit the movement of said wheel positioning assembly axially of said support member so that said wheel positioning assembly is fixedly yet removably mounted on said support member between said abutment means and said positioning locking member, and interconnecting means engaging said wheel positioning assembly mounted on said support member to maintain said wheel positioning assembly rotationally fixed with respect to said support member, said wheel position in assembly constructed and arranged to locate said tire assembly with respect to said support member so that the effective rotational axis of said tire assembly coincides with the adapter central axis of said upper support member and to clamp the vehicular wheel rim therein so that the tire assembly is rotationally fixed with respect to said wheel positioning assembly while said wheel positioning assembly is fixedly mounted on said support member between said abutment means and said positioning locking member.

5. The tire balancing machine of claim 4 adapted to locate the tire assembly using the central opening through the central disk on the vehicular wheel rim where the central opening is concentric with the effective rotational axis of the tire assembly wherein said wheel positioning assembly includes a backup member adapted to be removably mounted on said support member; a clamping member adapted to be removably mounted on said support member; a locating cone adapted to be removably mounted on said support member between said backup member and said clamping member; and spring means adapted to be removably mounted on said support member between said backup member and said clamping member, said backup member and said clamping member constructed and arranged to be forced toward each other by said abutment means and said positioning locking member to clamp the central disk of the wheel rim therebetween, and said locating cone and said spring means constructed and arranged so that said locating cone engages the central opening through the central disk on the vehicular wheel rim positioned between said backup member and said clamping member and locates the central opening concentrically of the adapter central axis whereby the effective rotational axis of the tire assembly coincides with the adapter central axis.

6. The tire balancing machine of claim 4 adapted to locate the tire assembly using the lug holes through the central disk on the vehicular wheel rim which are arranged concentrically of the effective rotational axis of the tire assembly wherein said wheel positioning assembly includes a pair of adapter plates adapted to be removably mounted on said support member and forced toward each other by said abutment means and said positioning locking member, each of said adapter plates defining a plurality of slots therethrough radially oriented with respect to the adapter central axis when said adapter plate is mounted on said support member, said plurality of slots corresponding in number and circumferential spacing to the lug holes in the vehicular wheel rim; and a plurality of adapter studs constructed and arranged to extend between said adapter plates and engage said slots in said adapter plates, said adapter studs adapted to extend through the lug holes in the vehicular wheel rim and, in combination with said adapter plates, locate the vehicular wheel rim so that the effective axis of rotation of the tire assembly coincides with the adapter central axis and clamp the vehicular wheel rim between said adapter studs and one of said adapter plates while said abutment means and said locking member force said adapter plates toward each other.

* * * * *